US012601850B2

(12) United States Patent
Aarre

(10) Patent No.: US 12,601,850 B2
(45) Date of Patent: Apr. 14, 2026

(54) SEISMIC MULTI-HORIZON TRACKING FRAMEWORK

(71) Applicant: Schlumberger Technology Corporation, Sugar Land, TX (US)

(72) Inventor: Victor Aarre, Stavanger (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/986,312

(22) Filed: Dec. 18, 2024

(65) Prior Publication Data

US 2025/0216567 A1     Jul. 3, 2025

Related U.S. Application Data

(60) Provisional application No. 63/611,285, filed on Dec. 18, 2023.

(51) Int. Cl.
*G01V 1/28*          (2006.01)
*G01V 1/00*          (2024.01)
*G01V 1/30*          (2006.01)

(52) U.S. Cl.
CPC .............. *G01V 1/282* (2013.01); *G01V 1/003* (2013.01); *G01V 1/302* (2013.01); *G01V 2210/1429* (2013.01); *G01V 2210/643* (2013.01)

(58) Field of Classification Search
CPC ........ G01V 1/003; G01V 1/282; G01V 1/302; G01V 2210/1429; G01V 2210/643
See application file for complete search history.

(56) References Cited

U.S. PATENT DOCUMENTS

| | | |
|---|---|---|
| 2010/0214870 A1 | 8/2010 | Pepper et al. |
| 2020/0049847 A1 | 2/2020 | Nguyen et al. |
| 2020/0326442 A1 | 10/2020 | Su |
| 2020/0363547 A1 | 11/2020 | Chen et al. |
| 2022/0334280 A1 | 10/2022 | Montouchet |
| 2023/0085023 A1* | 3/2023 | Possee ................... G01V 1/282 |
| | | 702/68 |

* cited by examiner

*Primary Examiner* — Yoshihisa Ishizuka
(74) *Attorney, Agent, or Firm* — Kyle R. Miiller

(57)          ABSTRACT

A method can include receiving seismic data from a three-dimensional seismic survey of a subsurface region that includes multiple horizons; determining an order of a set of points according to data quality metric values of the seismic data, where each point in the set of points is associated with one of the multiple horizons; tracking the multiple horizons serially, where one or more switching criteria cause the tracking to switch from one of the multiple horizons to another one of the multiple horizons according to the order of the set of points; and, based on the tracking, outputting a three-dimensional model of the multiple horizons in the subsurface region.

17 Claims, 14 Drawing Sheets

System 100

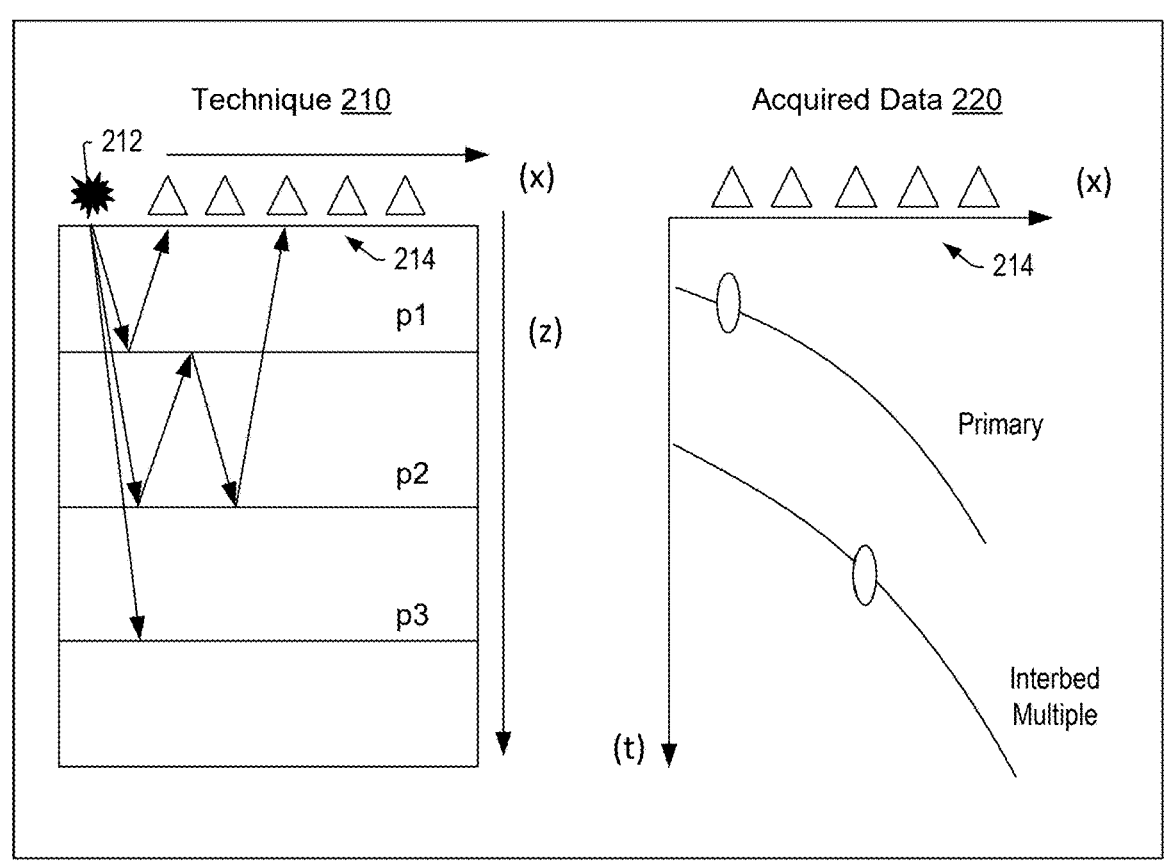
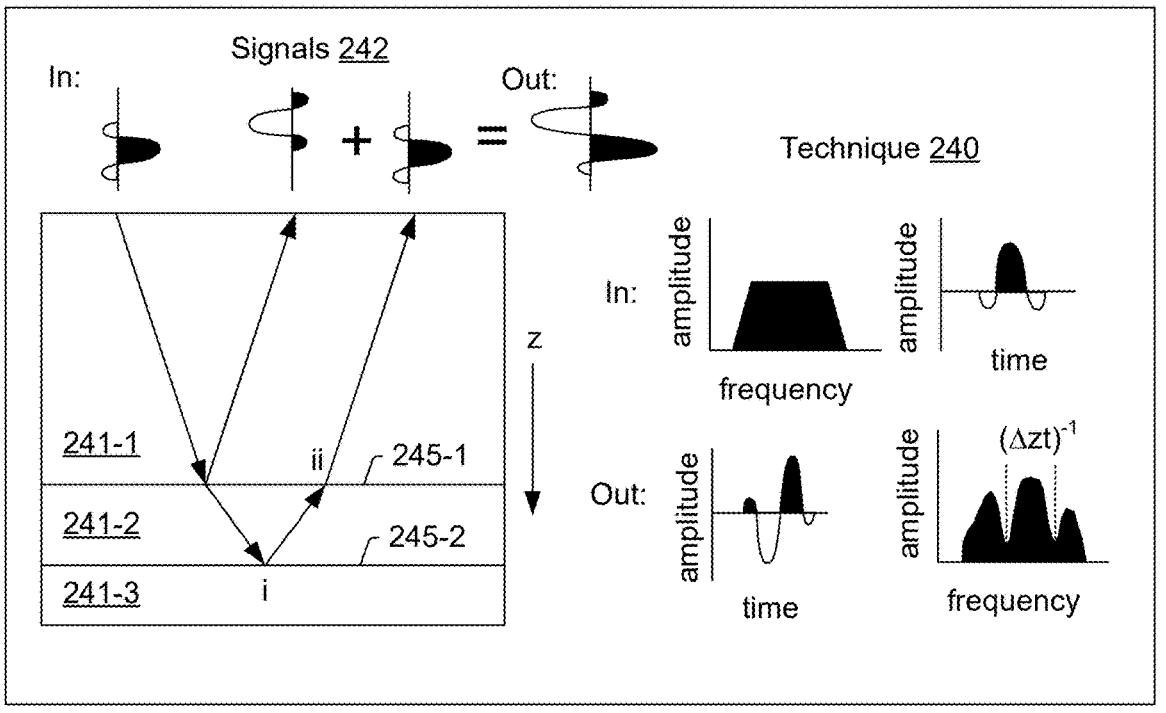
FIG. 2

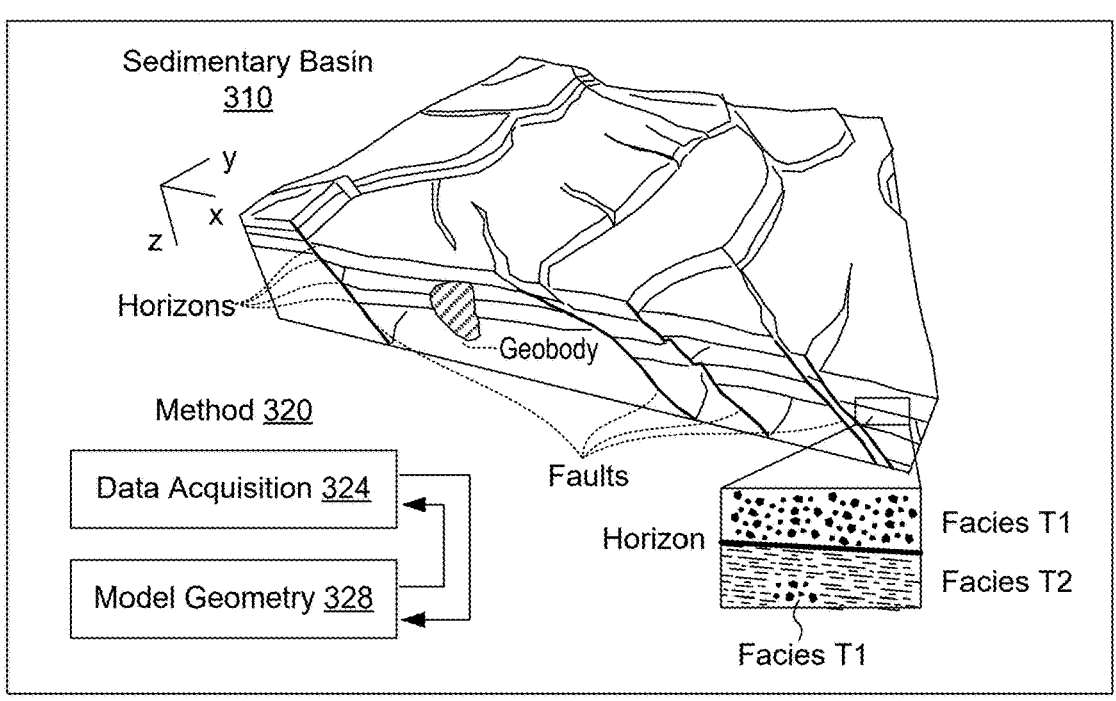

Sedimentary Basin
310

Horizons

Geobody

Method 320

Data Acquisition 324

Model Geometry 328

Faults

Horizon

Facies T1

Facies T2

Facies T1

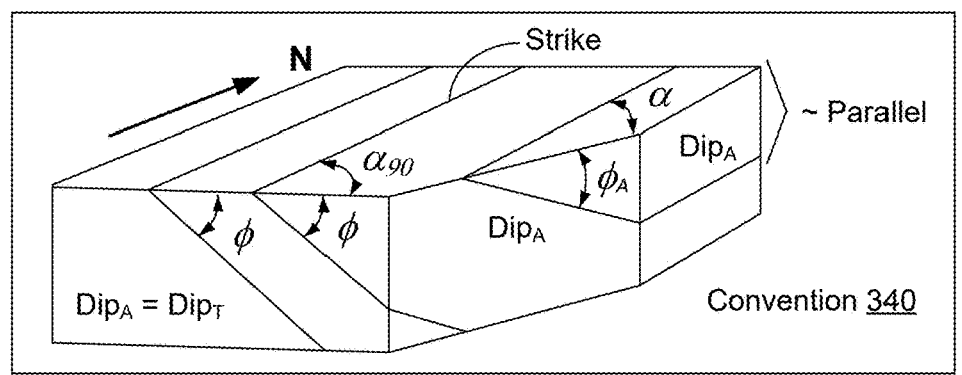

N

Strike

~ Parallel $\alpha$ $\alpha_{90}$ $\phi_A$ $Dip_A$ $\phi$   $\phi$ $Dip_A$ $Dip_A = Dip_T$ Convention 340

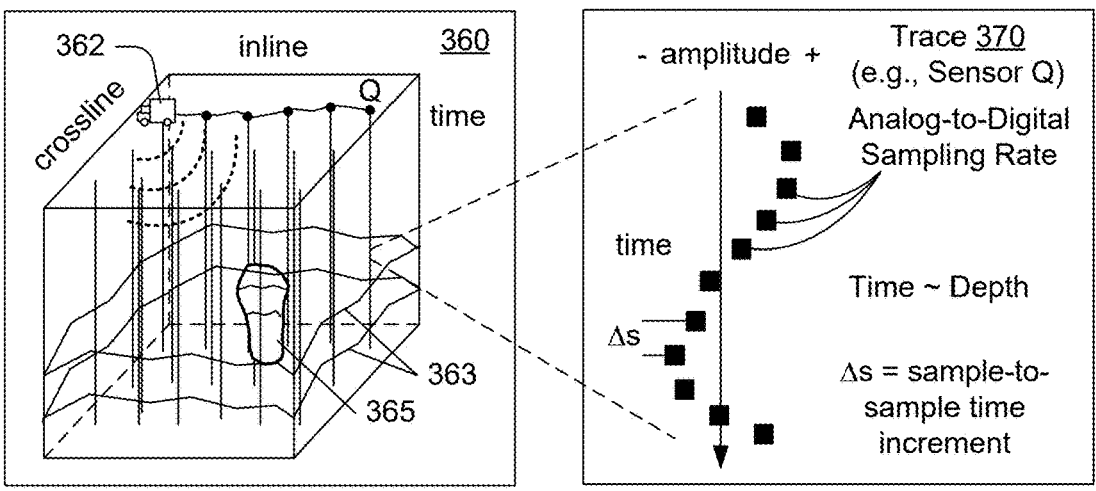

362         inline         360 crossline

Q time

363

365

- amplitude +         Trace 370
(e.g., Sensor Q)

Analog-to-Digital
Sampling Rate time

Time ~ Depth $\Delta s$ $\Delta s$ = sample-to-
sample time
increment

FIG. 3

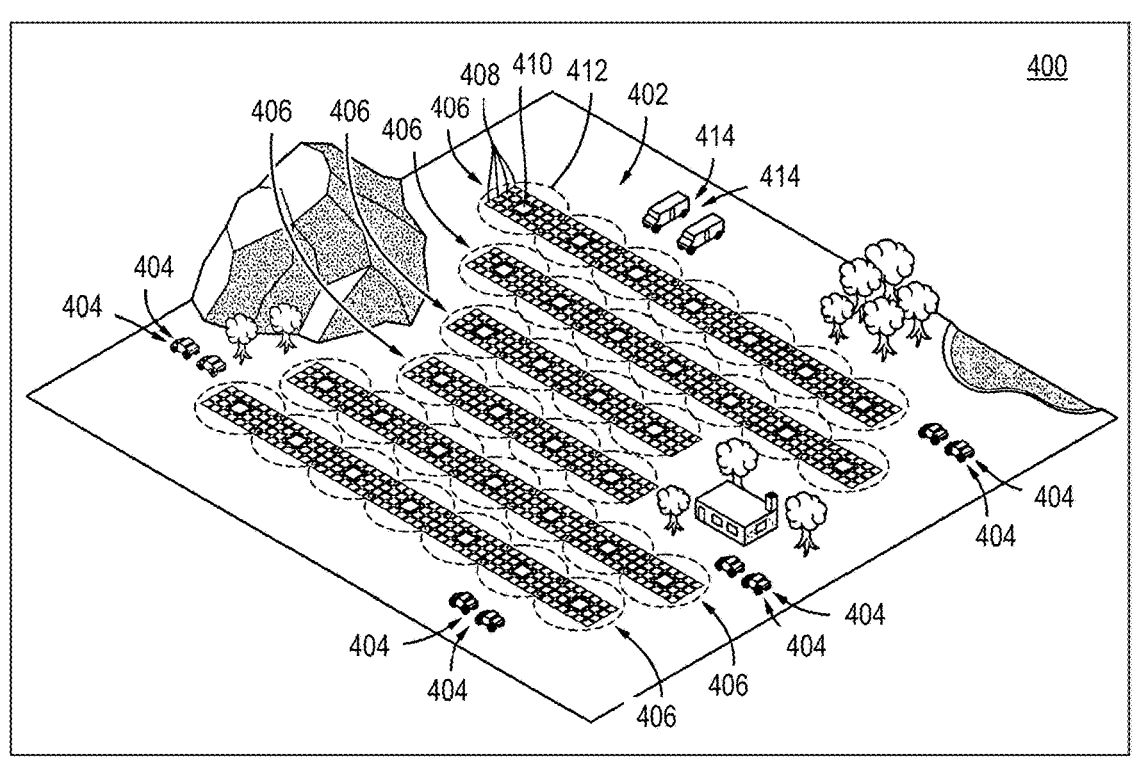
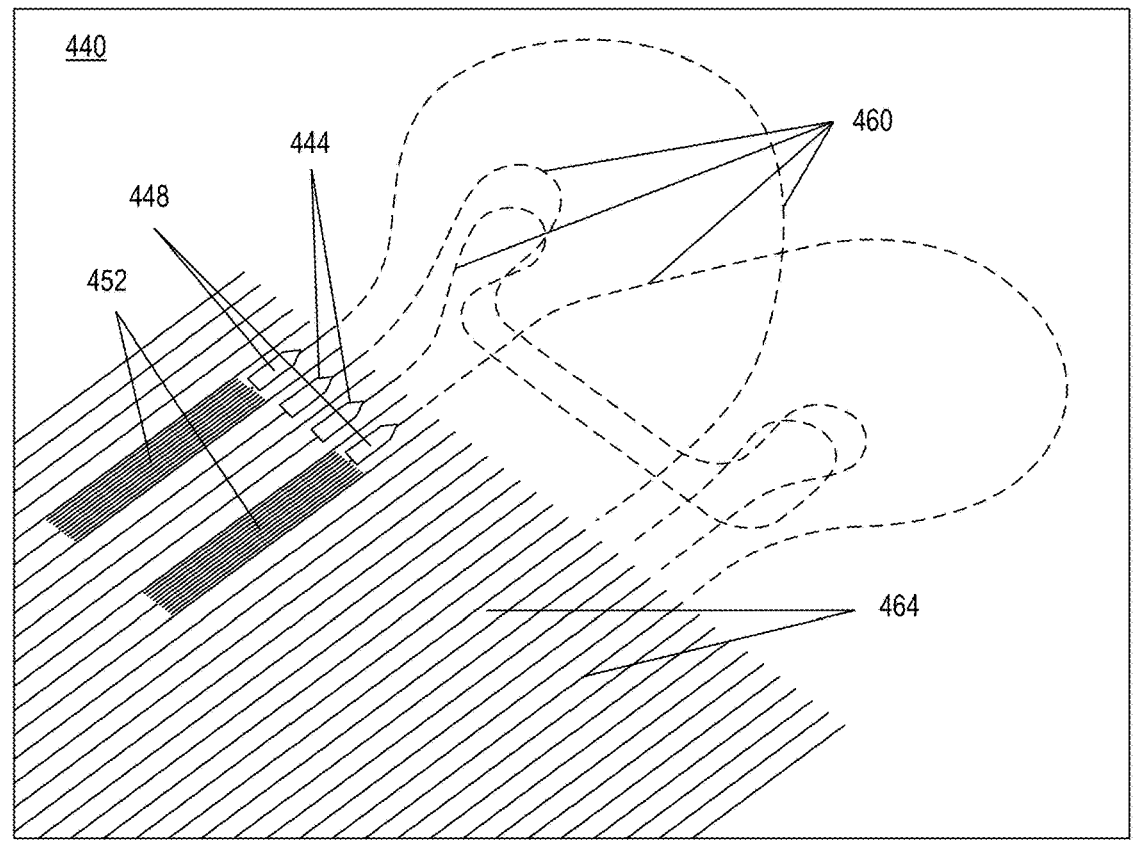
FIG. 4

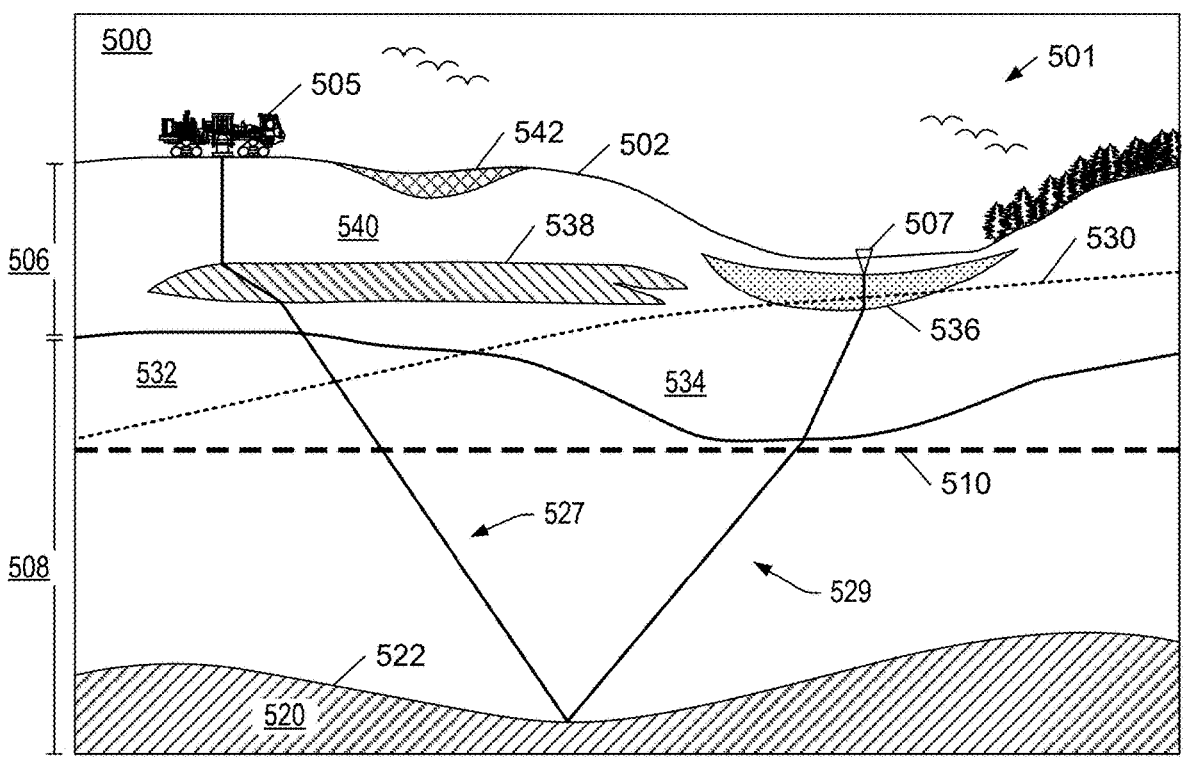
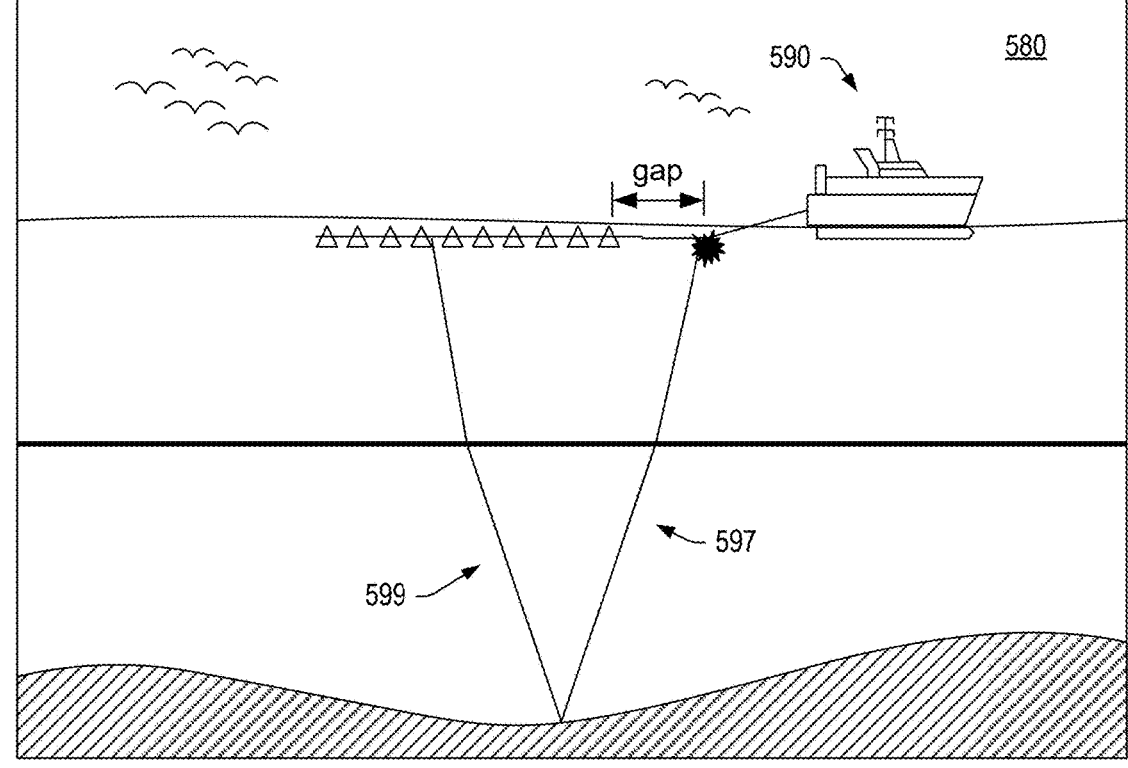
FIG. 5

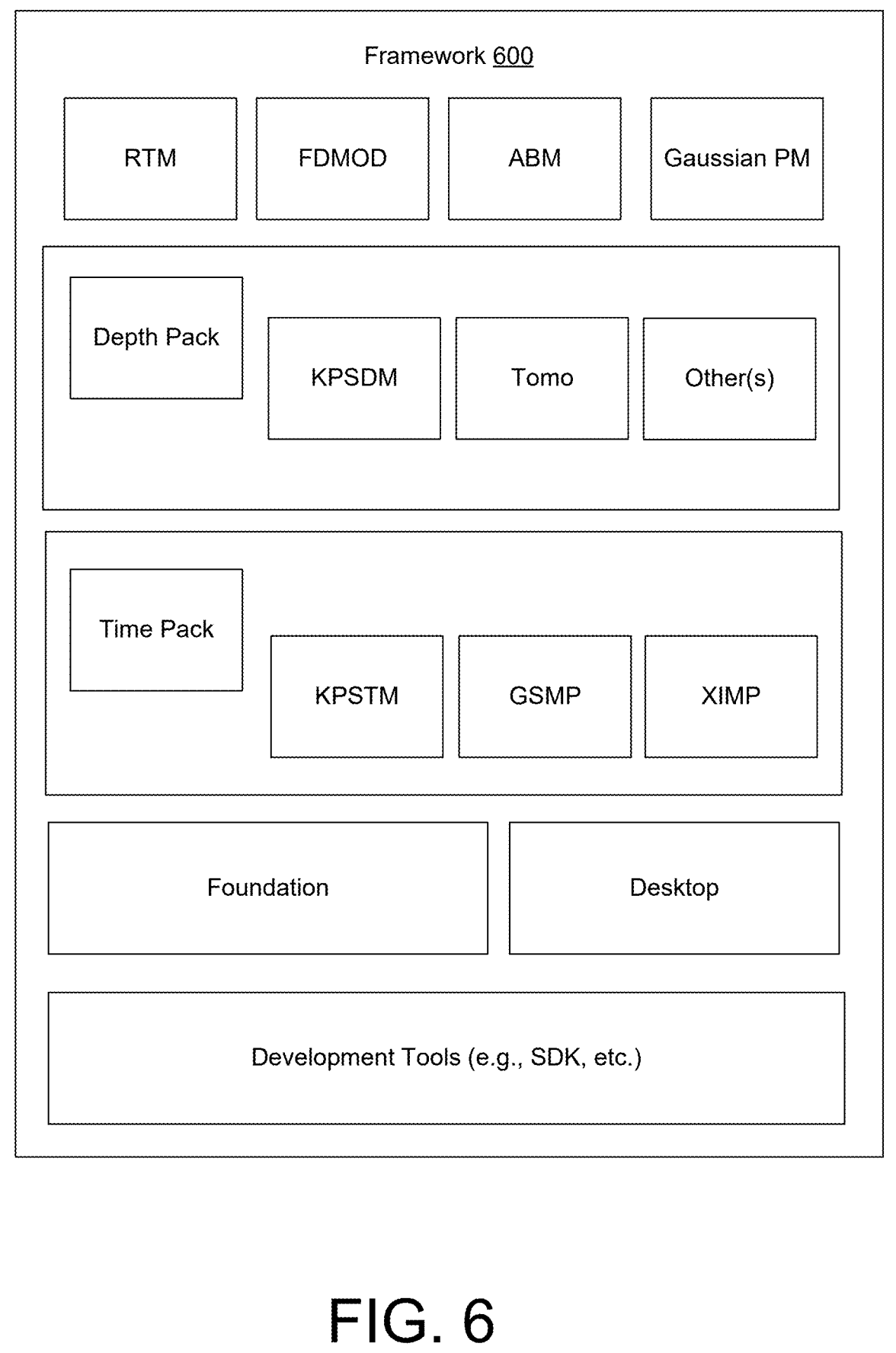

Framework 600

RTM

FDMOD

ABM

Gaussian PM

Depth Pack

KPSDM

Tomo

Other(s)

Time Pack

KPSTM

GSMP

XIMP

Foundation

Desktop

Development Tools (e.g., SDK, etc.)

FIG. 6

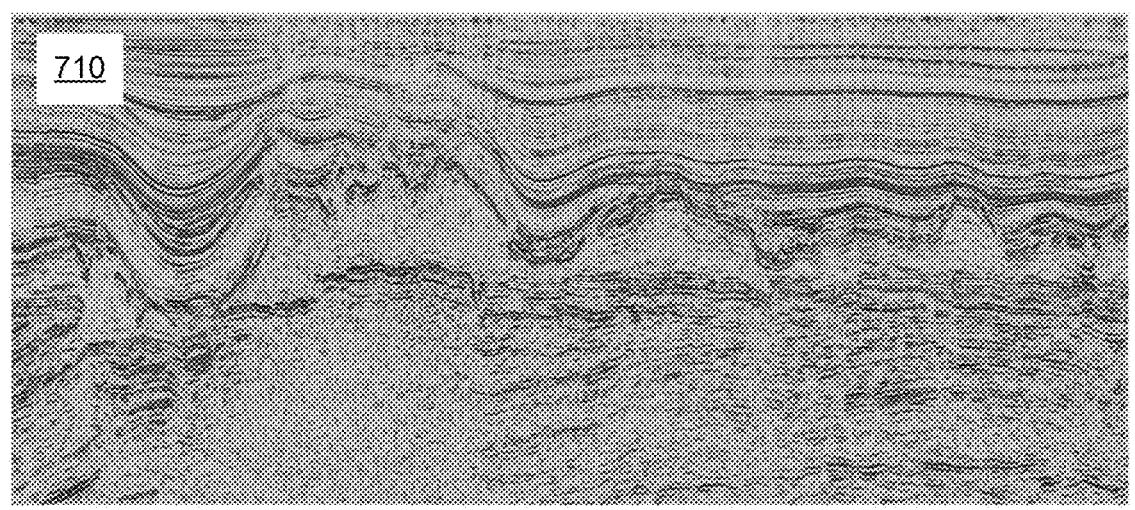
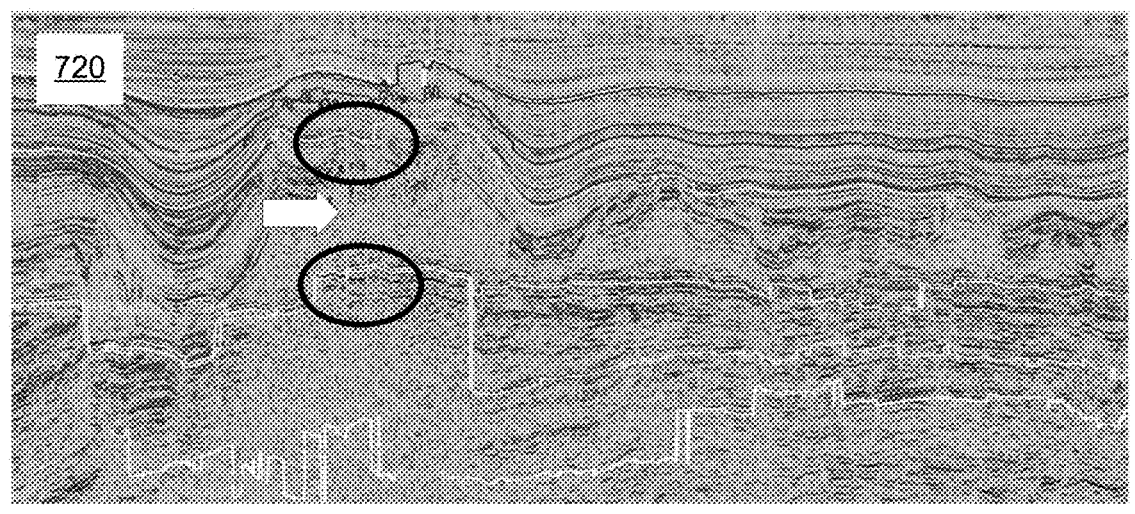
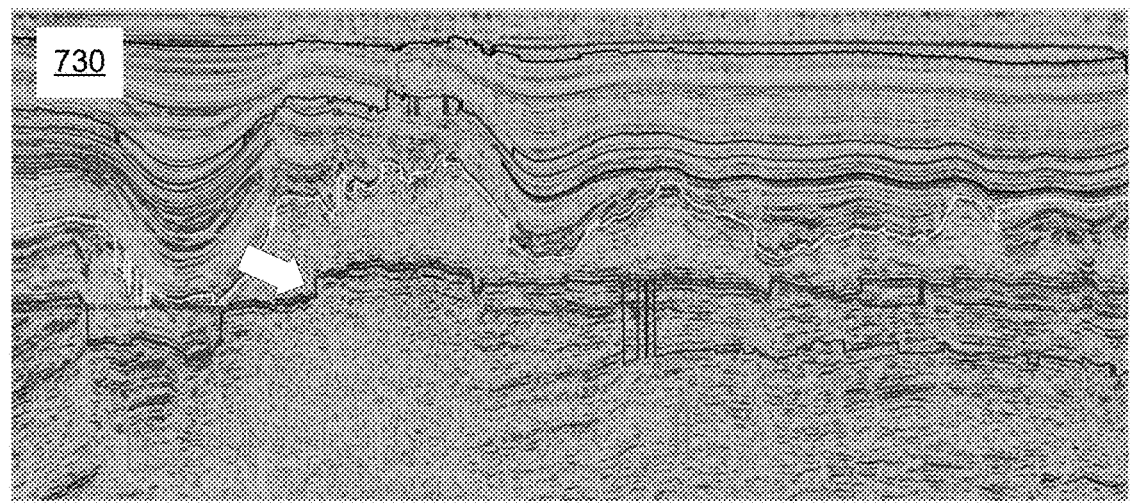
FIG. 7

800

Receive 810

Survey 812
(Cube Geometry)

Inline Dip 814
(Inline Cube)

Xline Dip 816
(XLine Cube)

Uncertainty 818
(Uncertainty Cube)

Seed List 820
(3D Points)

Track 840
(e.g., quality-based)

Assess Constraint(s) 860

Output Horizons 880

FIG. 10

Method 1200

Method 1300

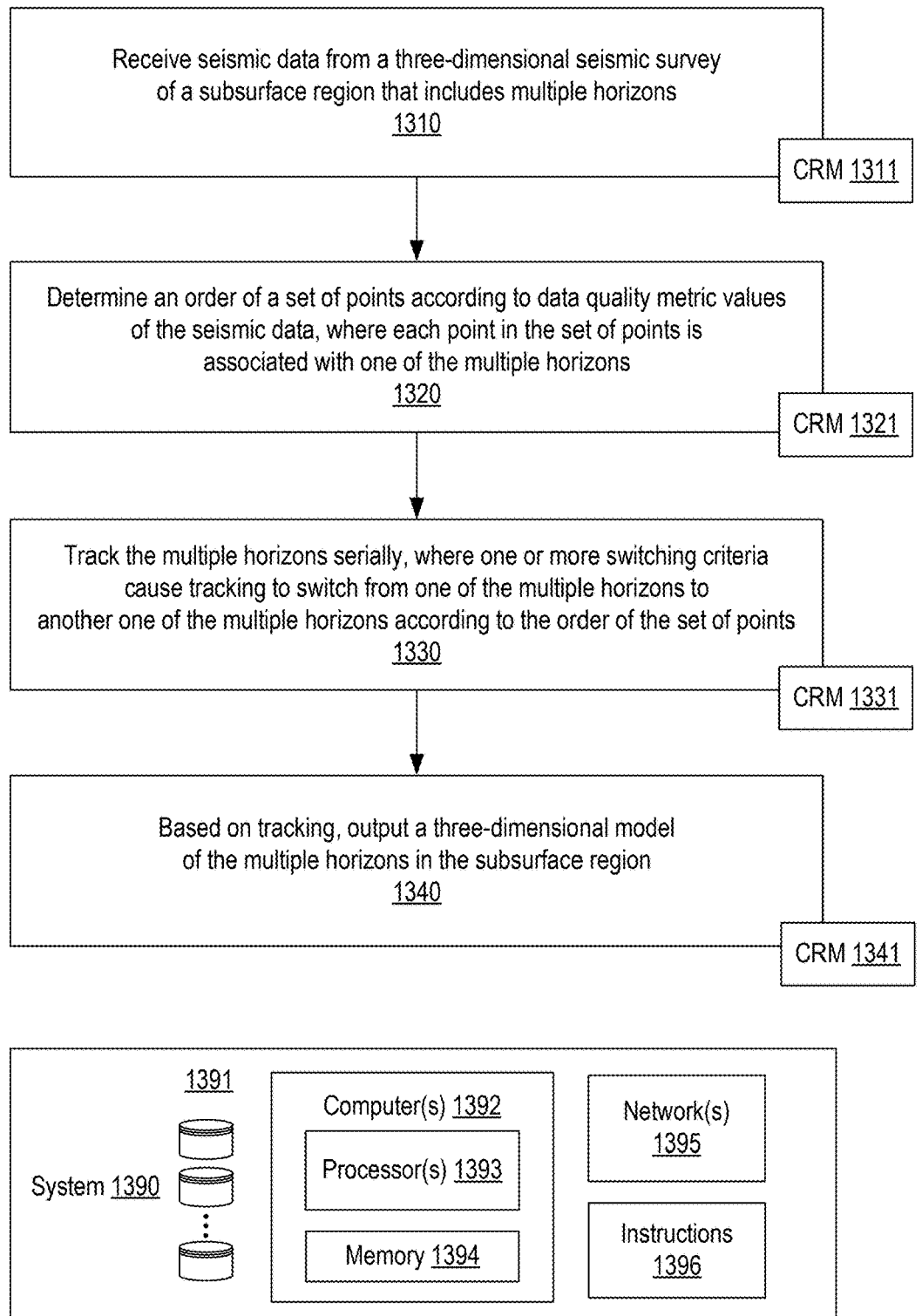

Receive seismic data from a three-dimensional seismic survey
of a subsurface region that includes multiple horizons
1310

CRM 1311

Determine an order of a set of points according to data quality metric values
of the seismic data, where each point in the set of points is
associated with one of the multiple horizons
1320

CRM 1321

Track the multiple horizons serially, where one or more switching criteria
cause tracking to switch from one of the multiple horizons to
another one of the multiple horizons according to the order of the set of points
1330

CRM 1331

Based on tracking, output a three-dimensional model
of the multiple horizons in the subsurface region
1340

CRM 1341

System 1390

1391

Computer(s) 1392

Processor(s) 1393

Memory 1394

Network(s) 1395

Instructions 1396

FIG. 13

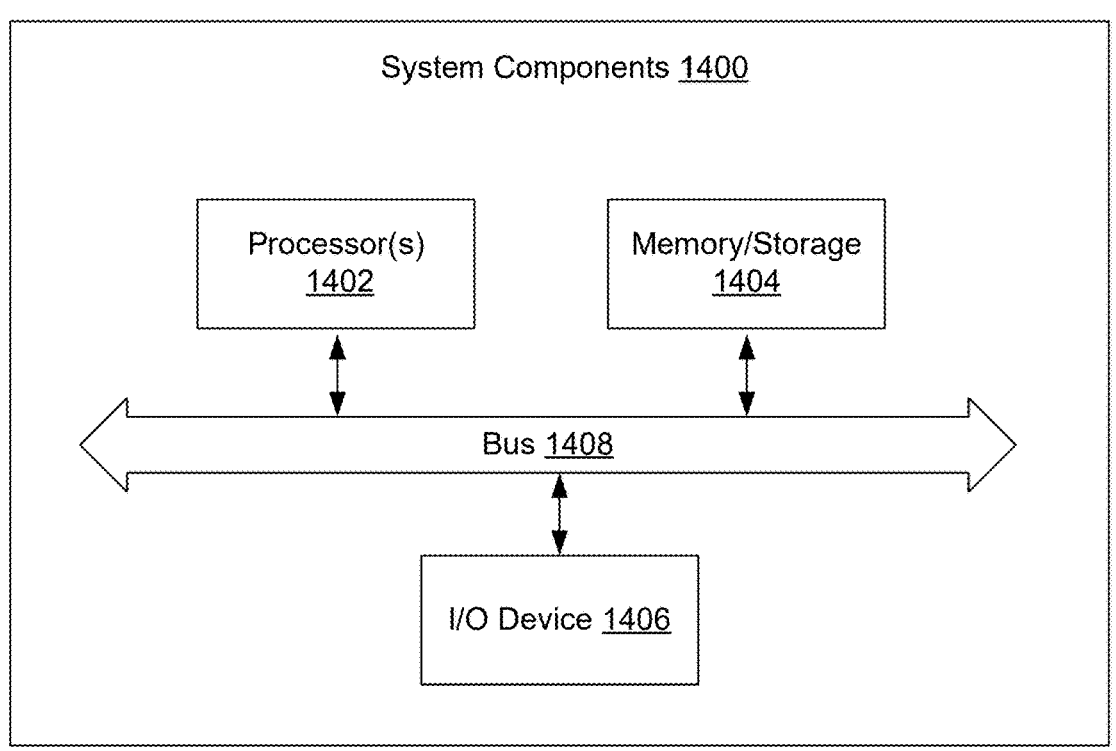
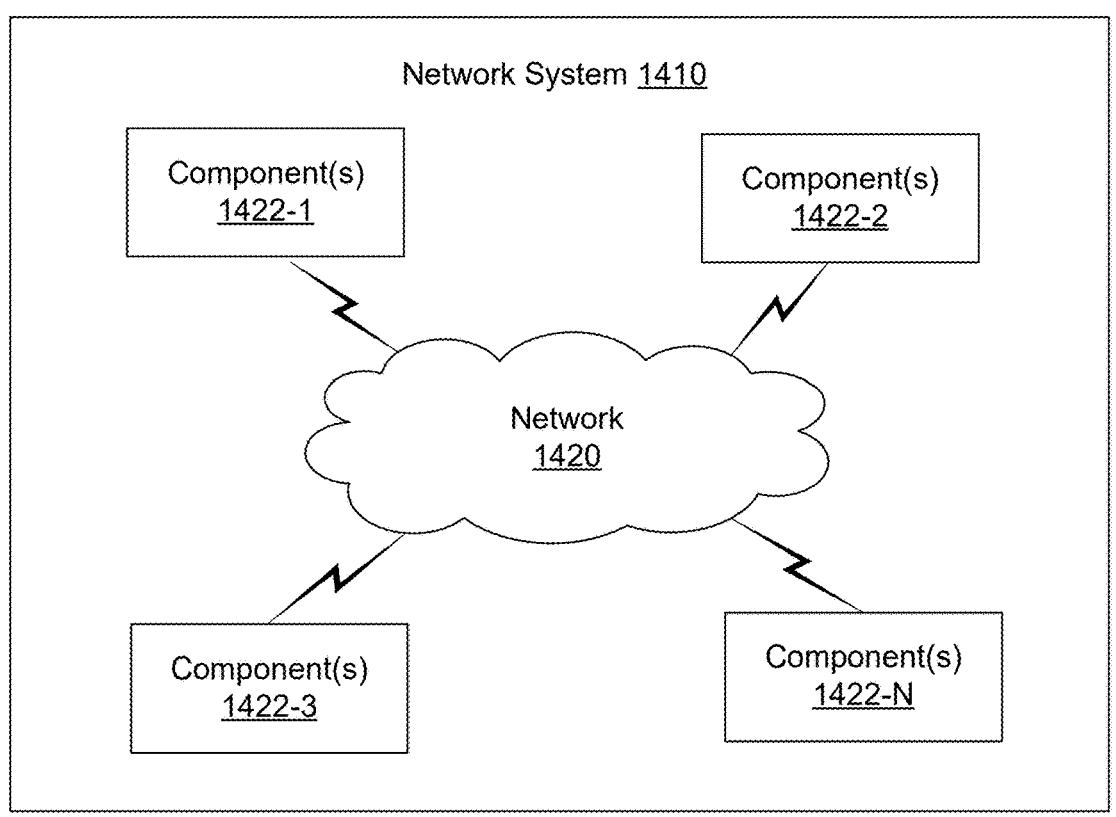
FIG. 14

SEISMIC MULTI-HORIZON TRACKING FRAMEWORK

RELATED APPLICATION

This application claims priority to and the benefit of a U.S. Provisional Application having Ser. No. 63/611,285, filed 18 Dec. 2023, which is incorporated by reference herein in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

Reflection seismology finds use in geophysics, for example, to estimate properties of subsurface formations (e.g., to characterize a subterranean environment with one or more formations). Reflection seismology can provide seismic data representing waves of elastic energy (e.g., as transmitted by P-waves and S-waves, in a frequency range of approximately 1 Hz to approximately 100 Hz). Seismic data can be processed and interpreted, for example, to understand better composition, fluid content, extent and geometry of subsurface rocks. Reflection seismology data from a seismic survey can be used to understand or characterize one or more subsurface formations.

In oil and gas exploration, interpretation is a process that involves analysis of data to identify and locate various subsurface structures (e.g., horizons, faults, geobodies, etc.) in a geologic environment. Such data can include reflection seismology data. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of identification of locations of hydrocarbons and resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc., where fluid may be produced via the borehole (e.g., as a completed well, etc.). One or more workflows may be performed using one or more computational frameworks and/or one or more pieces of equipment that include features for one or more of analysis, acquisition, model building, control, etc., for exploration, interpretation, drilling, fracturing, production, etc.

SUMMARY

A method can include receiving seismic data from a three-dimensional seismic survey of a subsurface region that includes multiple horizons; determining an order of a set of points according to data quality metric values of the seismic data, where each point in the set of points is associated with one of the multiple horizons; tracking the multiple horizons serially, where one or more switching criteria cause the tracking to switch from one of the multiple horizons to another one of the multiple horizons according to the order of the set of points; and, based on the tracking, outputting a three-dimensional model of the multiple horizons in the subsurface region. A system can include a processor; a memory accessible by the processor; processor-executable instructions stored in the memory and executable to instruct the system to: receive seismic data from a three-dimensional seismic survey of a subsurface region that includes multiple horizons; determine an order of a set of points according to data quality metric values of the seismic data, where each point in the set of points is associated with one of the multiple horizons; perform tracking of the multiple horizons serially, where one or more switching criteria cause the tracking to switch from one of the multiple horizons to another one of the multiple horizons according to the order of the set of points; and, based on the tracking, output a three-dimensional model of the multiple horizons in the subsurface region. One or more non-transitory computer-readable storage media can include computer-executable instructions executable to instruct a computing system to: receive seismic data from a three-dimensional seismic survey of a subsurface region that includes multiple horizons; determine an order of a set of points according to data quality metric values of the seismic data, where each point in the set of points is associated with one of the multiple horizons; perform tracking of the multiple horizons serially, where one or more switching criteria cause the tracking to switch from one of the multiple horizons to another one of the multiple horizons according to the order of the set of points; and, based on the tracking, output a three-dimensional model of the multiple horizons in the subsurface region.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 2 illustrates examples of techniques;

FIG. 3 illustrates an example of a subsurface region, an example of a method, examples of tools, an example of a convention and an example of a system;

FIG. 4 illustrates examples of seismic survey equipment;

FIG. 5 illustrates examples of seismic surveys;

FIG. 6 illustrates an example of framework;

FIG. 7 illustrates examples of seismic images;

FIG. 10 illustrates examples of seismic images;

FIG. 13 illustrates an example of a method and an example of a system; and

FIG. 14 illustrates example components of a system and a networked system.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
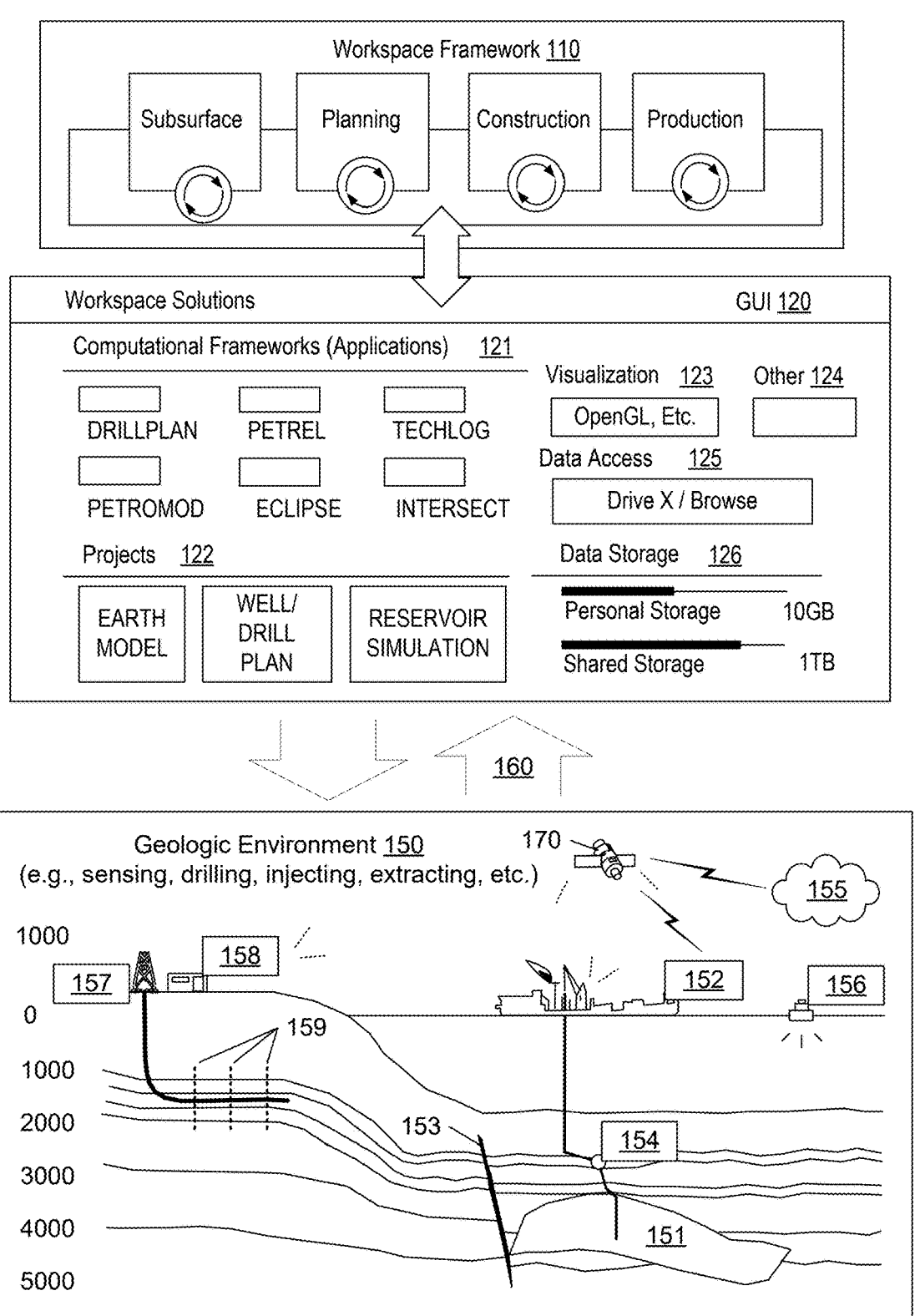
FIG. 1 illustrates an example of a geologic environment and an example of a system.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The DRILLOPS framework, which may be included in the system 100 of FIG. 1, may execute a digital drilling plan and ensures plan adherence, while delivering goal-based automation. The DRILLOPS framework may generate activity plans automatically for individual operations, whether they are monitored and/or controlled on the rig or in town. Automation may utilize data analysis and learning systems to assist and optimize tasks, such as, for example, setting ROP to drilling a stand. A preset menu of automatable drilling tasks may be rendered, and, using data analysis and models, a plan may be executed in a manner to achieve a specified goal, where, for example, measurements may be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) may be continually monitored and dynamically updated using feedback from operational activities. The DRILLOPS framework may provide for various levels of automation based on planning and/or re-planning (e.g., via the DRILLPLAN framework), feedback, etc.

The PETREL framework can be part of the DELFI cognitive exploration and production (E&P) environment (SLB, Houston, Texas), referred to as the DELFI environment, for utilization in geosciences and geoengineering, for example, to analyze subsurface data from exploration to production of fluid from a reservoir.

The DELFI environment is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, machine learning models, etc.).

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (chemical EOR) formulations where such formulations can be implemented in the field, can analyze application of steam injection and other thermal FOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases. For example, a workflow may utilize one or more of the DELFI environment on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

While several simulators are illustrated in the example of FIG. 1, one or more other simulators may be utilized, additionally or alternatively. For example, consider the VISAGE geomechanics simulator (SLB, Houston Texas) or the PIPESIM network simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, CO2 disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston, Texas).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As an example, a model may be a simulated version of an environment, which may include one or more sites of possible emissions. As an example, a simulator may include features for simulating physical phenomena in an environment based at least in part on a model or models. A simulator, such as a weather simulator, can simulate fluid flow in an environment based at least in part on a model that can be generated via a framework that receives satellite data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model (e.g., of the Earth, the atmosphere, the oceans, etc.).

Phenomena associated with a sedimentary basin (e.g., a subsurface region, whether below a ground surface, water surface, etc.) may be modeled using various equations (e.g., stress, fluid flow, phase, etc.). As an example, a numerical model of a basin may find use for understanding various processes related to exploration and production of natural resources (e.g., estimating reserves in place, drilling wells, forecasting production, controlling fracturing, etc.).

For application of a numerical technique, equations may be discretized using nodes, cells, etc. For example, a numerical technique such as the finite difference method can include discretizing a differential heat equation for temperature with respect to a spatial coordinate or spatial coordinates to approximate temperature derivatives (e.g., first order, second order, etc.). While temperature is mentioned, the finite difference method can be utilized for one or more of various variables (e.g., pressure, fluid flow, stress, strain, etc.). Further, where time is of interest, a derivative of a variable or variables with respect to time may be provided.

Where a sedimentary basin (e.g., subsurface region) includes various types of features (e.g., stratigraphic layers, fractures, faults, etc.), nodes, cells, etc., may represent, or be assigned to, such features. In turn, discretized equations may better represent the sedimentary basin and its features. As an example, a structured grid that can represent a sedimentary basin and its features, when compared to an unstructured grid, may allow for more simulations runs, more model complexity, less computational resource demands, less computation time, etc. In various examples, a structured approach and/or an unstructured approach may be utilized.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Digital images of a subsurface region of the Earth can be generated using digital seismic data acquired using reflection seismology as part of a seismic survey. A digital image can show subterranean structure, for example, as related to one or more of exploration for petroleum, natural gas, and mineral deposits. As an example, reflection seismology can include determining time intervals that elapse between initiation of a seismic wave at a selected shot point (e.g., the location where an explosion generates seismic waves) and the arrival of reflected or refracted impulses at one or more seismic detectors (e.g., sensing of seismic energy at one or more seismic receivers). As an example, a seismic air gun can be used to initiate seismic waves. As an example, one or more electric vibrators or falling weights (e.g., thumpers) may be employed at one or more sites. Upon arrival at the detectors, the amplitude and timing of seismic energy waves can be recorded, for example, as a seismogram (e.g., a record of ground vibrations).

In various regions of the Earth, the material density (e.g., rock density) increases with depth. Seismic energy waves can be initiated at a shot point (or points) at or near the surface where a portion of the seismic energy, as waves, may reach one or more receiving points. Material properties and structural organization of materials (e.g., as objects, layers, etc.) can affect seismic energy waves in one or more manners. Received seismic energy waves can be utilized to determine one or more types of material properties and/or structural organization of one or more types of materials. As with sound traveling through air or water, seismic energy waves can be attenuated as they pass through subsurface materials, which may include air, water, hydrocarbons, rock, etc. Such attenuation can occur in a manner that is dependent on material properties of such materials.

Interpretation of the depths and media reached by seismic energy waves can depend on geometry of a seismic survey, for example, on the distance between shot points and receiving points, as well as densities of media. Results of a seismic survey may be in digital form (e.g., digital data) as stored in memory of a computing device where display circuitry (e.g., a graphics processor, a video processor, etc.) can render the digital data to a display in the form of a cross-sectional image of subsurface structures as if cut by a plane through the shot point, the detector, and a reference point such as the Earth's center. As an example, digital image processing can involve receiving seismic data as digital data, processing the seismic data via one or more techniques, and rendering processed seismic data to a display as an image of a region of the Earth that can show structural features of the Earth that otherwise are not visible from an observer standing on the surface of the Earth.

A seismic survey can be defined with respect to a region of the Earth and, for example, a manner of acquisition of seismic data. As an example, a survey may be two-dimensional, three-dimensional, four-dimensional, etc. Dimensions include one or more spatial dimensions and optionally one or more temporal dimensions (e.g., repeating a survey for a region at different points in time). As to a 2D survey, a grid may be considered dense if the line spacing (e.g., of receivers) is less than about 400 m. As to a 3D spatial survey, in comparison to a 2D spatial survey, it may help to elucidate true structural dip (e.g., a 2D survey may give apparent dip), it may provide more and better stratigraphic information, it may provide a map view of reservoir properties, it may provide a better areal mapping of fault patterns and connections and delineation of reservoir blocks, it may provide better lateral resolution (e.g., 2D may suffer from a crossline smearing, or Fresnel zone, problem).

As to data sets, a 3D spatial seismic data set can be a cube or volume of data. As an example, a 2D spatial seismic data set can be a panel of data. To interpret 3D seismic data, a method can process the "interior" of the cube (e.g., seismic cube) using one or more processors of computing equipment. As an example, a 3D seismic data set can range in size from a few tens of megabytes to several gigabytes or more.

As to a 3D seismic cube, a point can have an (x, y, z) coordinate and a data value. A coordinate can be a distance from a particular corner of the cube. A 3D seismic data volume is like a room-temperature example (e.g., where temperature differs in a cube shaped room), however, rather than a height of a room, a height or vertical axis can be in terms of a two-way traveltime, which may be a proxy for depth. In such an example, the 3D seismic cube is still a spatial cube because the data therein correspond to the same survey where, rather than depth, two-way traveltime (TWT) is utilized, which, can be, in general, a proxy for depth. And, in contrast to room-temperature, data values can be seismic amplitudes (e.g., amplitudes of seismic energy waves). A 3D seismic data set can be, for example, a box full of electronically determined numbers where each number represents a measurement (e.g., amplitude of a seismic energy wave, etc.). In a 3D seismic data set, amplitudes may be rendered as data values in the form of one or more images for slices through the 3D seismic data set where, for example, in grayscale, dark and light image bands in the sections are related to rock boundaries.

Reflection seismology can be implemented as a technique that detects "edges" of materials in the Earth. An image generated utilizing reflection seismology can show such edges of materials, which can be equated to positions in the Earth such that one may know where an edge of a material is in the Earth. For example, where the edge corresponds to a hydrocarbon reservoir, a method can include drilling to the reservoir in a manner guided by the position of the edge. As an example, a drilling process can be manual, semi-automated or automated where positional information as to an edge of a material in the Earth can be utilized to guide drilling equipment that forms a bore in the Earth where the bore may be directed to the edge or to a region that is defined at least in part by the edge. Where reflection seismology is improved, such an "edge" may be detected more readily and/or with greater accuracy (e.g., resolution), which, in turn, can improve one or more field processes such as a drilling process.

FIG. 2 shows an example of a technique 210 and acquired data 220, an example of a technique 240 and signals 242. As mentioned, a survey can include utilizing a source or sources and receivers. In the example technique 210, a source 212 is illustrated along with a plurality of receivers 214 that are spaced along a direction defined as an inline direction x. Along the inline direction x, distances can be determined between the source 212 and each of the receivers 214.

A subsurface region being surveyed includes features such a surface and subsurface horizons p1, p2 and p3 where one or more of such structural features can be interfaces where elastic properties can differ such that seismic energy is at least in part reflected. For example, a horizon can be an interface that might be represented by a seismic reflection, such as the contact between two bodies of rock having different seismic velocity, density, porosity, fluid content, etc. In the example of FIG. 2, the technique 210 is shown to generate seismic reflections, which can include singly reflected and multiply reflected seismic energy. The acquired data 220 illustrate energy received by the receivers 214 with respect to time, t, and their inline position along the x-axis. As shown, singly reflected energy can be defined as primary (or primaries) while multiply reflected energy can be defined as multiples such as surface multiples, interbed multiples (e.g., IM), etc.

A primary can be defined as a seismic event whose energy has been reflected once; whereas, a multiple can be defined as an event whose energy has been reflected more than once. With respect to seismic interpretation, whether manual, semi-automatic or automatic, various techniques may aim to enhance primary reflections to facilitate interpretation of one or more subsurface interfaces. In other words, multiples can be viewed as extraneous signal or noise that can interfere with an interpretation process. As an example, one or more method can utilize multiples to provide useful signals. For example, consider a seismic survey designed to increase seismic signal coverage of a subsurface region of the Earth through use of multiples.

In FIG. 2, the technique 240 can include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

A wavelet can be a one-dimensional pulse defined by attributes such as, for example, amplitude, frequency and phase. A wavelet can originate as a packet of energy from a source point, having a specific origin in time, and be returned to one or more receivers as a series of events distributed in time and energy. The distribution is a function of velocity and density changes in the subsurface and the relative position of the source and receiver. Energy that returns cannot exceed what was input, so the energy in a received wavelet decays with time, for example, as more partitioning takes place at interfaces. Wavelets can also decay due to loss of energy as heat during propagation, which can be more extensive at higher frequencies. In various instances, received wavelets can tend to contain less high-frequency energy relative to low frequencies at longer travel times. Some wavelets are known by their shape and spectral content, such as the Ricker wavelet (e.g., a zero-phase wavelet such as the second derivative of the Gaussian function or the third derivative of the normal-probability density function).

As an example, a geologic environment may include layers 241-1, 241-2 and 241-3 where an interface 245-1 exists between the layers 241-1 and 241-2 and where an interface 245-2 exists between the layers 241-2 and 241-3. As illustrated in FIG. 2, a wavelet may be first transmitted downward in the layer 241-1; be, in part, reflected upward by the interface 245-1 and transmitted upward in the layer 241-1; be, in part, transmitted through the interface 245-1 and transmitted downward in the layer 241-2; be, in part, reflected upward by the interface 245-2 (see, e.g., "i") and transmitted upward in the layer 241-2; and be, in part, transmitted through the interface 245-1 (see, e.g., "ii") and again transmitted in the layer 241-1. In such an example, signals (see, e.g., the signals 242) may be received as a result of wavelet reflection from the interface 245-1 and as a result of wavelet reflection from the interface 245-2. These signals may be shifted in time and in polarity such that addition of these signals results in a waveform that may be analyzed to derive some information as to one or more characteristics of the layer 241-2 (e.g., and/or one or more of the interfaces 245-1 and 245-2). For example, a Fourier transform of signals may provide information in a frequency domain that can be used to estimate a temporal thickness (e.g., $\Delta zt$) of the layer 241-2 (e.g., as related to acoustic impedance, reflectivity, etc.).

FIG. 3 shows an example of a sedimentary basin 310 (e.g., a geologic environment), an example of a method 320 for model building (e.g., for a simulator, etc.), an example of a convention 340 and an example of a system 360.

As an example, data acquisition, reservoir simulation, petroleum systems modeling, etc. may be applied to characterize various types of subsurface environments, including environments such as those of FIG. 1.

In FIG. 3, the sedimentary basin 310, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 320 includes a data acquisition block 324 and a model geometry block 328. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

As shown, the basin 310 can include various subsurface layers, which may be defined by interfaces. As an example, an interface can be a horizon. In geophysics, a horizon is an interface that might be represented by a seismic reflection, such as the contact between two bodies of rock having one or more properties that differ (e.g., consider differences in one or more of seismic velocity, density, porosity, fluid content, etc.). A horizon may be defined through use of borehole data, for example, data acquired by a downhole tool disposed in a borehole.

As an example, the basin 310 may include one or more boreholes, which may be for exploration, production, injection, etc. A borehole in a basin may be drilled with one or more of a vertical portion, a deviated portion, a curved portion, and a lateral portion. As an example, one or more types of downhole tools may be configured to acquire one or more types of data. As an example, the fullbore Formation MicroImager (FMI) tool (SLB, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material. Borehole image data may be utilized to identify one or more interfaces. For example, borehole image data may provide for identifying a horizon, a formation top, etc. In various instances, borehole data may be referred to as log data, for example, data from a logging tool that can be moved along a longitudinal axis of a borehole. In various instances, log data can form a log of measurements with respect to distance, which may be referred to as a well log.

In various workflows, a formation top or another type of correlation marker on a log may be tied to a seismic horizon or vice versa. For example, a slice of seismic data may be rendered to a display where a formation top position from borehole data of a borehole that extends into the formation is overlayed on the slice. In such an example, the formation top may be considered a known position of a horizon where a portion of the seismic data (e.g., a reflector) can be tied to the formation top. However, variations can exist in quality of log data as well as quality of seismic data, which at times can introduce challenges in making such associations (e.g., ties). To address quality issues, careful processing of log data may be performed (e.g., to help to smooth spurious data readings, etc.), along with careful processing of seismic data. Ultimately, proper identification of multidimensional spans of horizons in multidimensional seismic data can facilitate modeling, for example, to develop a proper model geometry (see, e.g., the model geometry block 328), which may be a basis for one or more types of models (e.g., mechanical earth model, reservoir model, velocity model, etc.).

As to the convention 340 for dip, as shown in FIG. 3, the three-dimensional orientation of a plane can be defined by its dip and strike, which can be considered to be types of orientation information (e.g., structural orientation information). Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 340 of FIG. 3, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 340 of FIG. 3). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 340 of FIG. 3). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 340 of FIG. 3, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 340 of FIG. 3, apparent dip may be approximately 0 degrees (e.g., parallel to a horizontal surface where an edge of a cutting plane runs along a strike direction).

In terms of observing dip in boreholes, true dip is observed in boreholes drilled vertically. In boreholes drilled in any other orientation (or deviation), the dips observed are apparent dips (e.g., which are referred to by some as relative dips). In order to determine true dip values for planes observed in such boreholes, as an example, a vector computation (e.g., based on the borehole deviation and borehole azimuth) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 340 may be used with respect to an analysis, an interpretation, an attribute, etc. (e.g., consider a PETREL seismic-to-simulation framework workflow, etc.). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in the system 360 of FIG. 3, a geobody 365 may be present in a geologic environment. For example, the geobody 365 may be a salt dome. A salt dome may be a mushroom-shaped or plug-shaped diapir made of salt and may have an overlying cap rock (e.g., or caprock). Salt domes can form as a consequence of the relative buoyancy of salt when buried beneath other types of sediment. Hydrocarbons may be found at or near a salt dome due to formation of traps due to salt movement in association evaporite mineral sealing. Buoyancy differentials can cause salt to begin to flow vertically (e.g., as a salt pillow), which may cause faulting. In the system 360, the geobody 365 is met by layers 363 which may each be defined by a dip angle $\phi$.

As an example, seismic data may be acquired for a region in the form of traces. In the example of FIG. 3, the system 360 shows acquisition equipment 362 emitting energy from a source (e.g., a transmitter) and receiving reflected energy via one or more sensors (e.g., receivers) strung along an inline direction. As the region includes the layers 363 and the geobody 365, energy emitted by a transmitter of the acquisition equipment 362 can reflect off the layers 363 and the geobody 365. Evidence of such reflections may be found in the acquired traces.

As shown in FIG. 3, for a portion of a trace 370, energy received may be discretized by an analog-to-digital converter that operates at a sampling rate. For example, the acquisition equipment 362 may convert energy signals sensed by sensor Q to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

As explained, one or more types of data may facilitate model building, which can include seismic interpretation. As an example, imagery data such as surface imagery (e.g., satellite, geological, geophysical, etc.) may be stored, processed, communicated, etc. As an example, data may include SAR data, GPS data, etc. and may be stored, for example, in one or more storage devices where such data can be accessible by a computing system that may provide for execution of one or more computational frameworks.

As explained, in FIG. 3, the system 360 includes a relatively basic representation of seismic data acquisition equipment that can acquire seismic data in the form of traces. FIG. 4 and FIG. 5 show additional examples of equipment, including equipment for land-based acquisition and marine-based acquisition (e.g., water-based or sea-based acquisition).

FIG. 4 shows an example of a simplified schematic view of a land seismic data acquisition system 400 and an example of a simplified schematic view of a marine seismic data acquisition system 440.

As shown with respect to the system 400, an area 402 to be surveyed may or may not have physical impediments to direct wireless communication between a recording station 414 (which may be a recording truck) and a vibrator 404. A plurality of vibrators 404 may be employed, as well as a plurality of sensor unit grids 406, each of which may have a plurality of sensor units 408.

As illustrated in FIG. 4 with respect to the system 400, approximately 24 to about 28 sensor units 408 may be placed in a vicinity (a region) around a base station 410. The number of sensor units 408 associated with each base station 410 may vary from survey to survey. Circles 412 indicate an approximate range of reception for each base station 410.

In the system 400 of FIG. 4, the plurality of sensor units 408 may be employed in acquiring and/or monitoring land-seismic sensor data for the area 402 and transmitting the data to the one or more base stations 410. Communications between the vibrators 404, the base stations 410, the recording station 414, and the seismic sensors 408 may be wireless (at least in part via air for a land-based system; or optionally at least in part via water for a sea-based system).

In the system 440 of FIG. 4, one or more source vessels 444 may be utilized with one or more streamer vessels 448 or a vessel or vessels may tow both a source or sources and a streamer or streamers 452. In the example of FIG. 4, the vessels 444 and 448 (e.g., or just the vessels 448 if they include sources) may follow predefined routes (e.g., paths) for an acquisition geometry that includes inline and crossline dimensions. As shown, routes 460 can be for maneuvering the vessels to positions 464 as part of the survey. As an example, a marine seismic survey may call for acquiring seismic data during a turn (e.g., during one or more of the routes 460).

The example systems 400 and 440 of FIG. 4 demonstrate how surveys may be performed according to an acquisition geometry that includes dimensions such as inline and crossline dimensions, which may be defined as x and y dimensions in a plane or surface where another dimension, z, is a depth dimension. As explained, time can be a proxy for depth, depending on various factors, which can include knowing how many reflections may have occurred as a single reflection may mean that depth of a reflector can be approximated using one-half of a two-way traveltime, some indication of the speed of sound in the medium and positions of the receiver and source (e.g., corresponding to the two-way traveltime).

Two-way traveltime can be defined as the elapsed time for a seismic wave to travel from its source to a given reflector and return to a receiver (e.g., at a surface, etc.). As an example, a minimum two-way traveltime can be defined to be that of a normal-incidence wave with zero offset.

FIG. 5 shows an example of a land system 500 and an example of a marine system 580. The land system 500 is shown in a geologic environment 501 that includes a surface 502, a source 505 at the surface 502, a near-surface zone 506, a receiver 507, a bedrock zone 508 and a datum 510 where the near-surface zone 506 (e.g., near-surface region) may be defined at least in part by the datum 510, which may be a depth or layer or surface at which data above are handled differently than data below. For example, a method can include processing seismic data that aims to "place" the source 505 and the receiver 507 on a datum plane defined by the datum 510 by adjusting (e.g., "correcting") travel times for propagation through the near-surface region (e.g., a shallower subsurface region).

In the example system 500 of FIG. 5, the geologic environment 501 can include various features such as, for example, a layer 520 that defines an interface 522 that can be a reflector, a water table 530, a leached zone 532, a glacial scour 534, a buried river channel 536, a region of material 538 (e.g., ice, evaporates, volcanics, etc.), a high velocity zone 540, and a region of material 542 (e.g., Eolian or peat deposits, etc.).

In FIG. 5, the land system 500 is shown with respect to downgoing rays 527 (e.g., downgoing seismic energy) and upgoing rays 529 (e.g., upgoing seismic energy). As illustrated the rays 527 and 529 pass through various types of materials and/or reflect off of various types of materials.

Various types of seismic surveys can contend with surface unevenness and/or near-surface heterogeneity. For example, a shallow subsurface can include large and abrupt vertical and horizontal variations that may be, for example, caused by differences in lithology, compaction cementation, weather, etc. Such variations can generate delays or advances in arrival times of seismic waves passing through them relative to waves that do not. By accounting for such time differences, a seismic image may be of enhanced resolution with a reduction in false structural anomalies at depth, a reduction in mis-ties between intersecting lines, a reduction in artificial events created from noise, etc.

In FIG. 5, the datum 510 is shown, for example, as a plane, below which strata may be of particular interest in a seismic imaging workflow. In a three-dimensional model of a geologic environment, a near surface region may be defined, for example, at least in part with respect to a datum. As an example, a velocity model may be a multidimensional model that models at least a portion of a geologic environment.

In the example of FIG. 5, the source 505 can be a seismic energy source such as a vibrator. As an example, a vibrator may be a mechanical source that delivers vibratory seismic energy to the Earth for acquisition of seismic data. As an example, a vibrator may be mounted on a vehicle (e.g., a truck, etc.). As an example, a seismic source or seismic energy source may be one or more types of devices that can generate seismic energy (e.g., an air gun, an explosive charge, a vibrator, etc.).

As an example, a sensor unit can include a geophone, which may be configured to detect motion in a single direction. As an example, a geophone may be configured to detect motion in a vertical direction. As an example, three mutually orthogonal geophones may be used in combination to collect so-called 3C seismic data. As an example, a sensor unit that can acquire 3C seismic data may allow for determination of type of wave and its direction of propagation. As an example, a sensor assembly or sensor unit may include circuitry that can output samples at intervals of 1 ms, 2 ms, 4 ms, etc. As an example, an assembly or sensor unit can include an analog to digital converter (ADC) such as, for example, a 24-bit sigma-delta ADC (e.g., as part of a geophone or operatively coupled to one or more geophones). As an example, a sensor assembly or sensor unit can include synchronization circuitry such as, for example, GPS synchronization circuitry with an accuracy of about plus or minus 12.5 microseconds. As an example, an assembly or sensor unit can include circuitry for sensing of real-time and optionally continuous tilt, temperature, humidity, leakage, etc. As an example, an assembly or sensor unit can include calibration circuitry, which may be self-calibration circuitry.

In FIG. 5, the system 580 includes equipment 590, which can be a vessel that tows one or more sources and one or more streamers (e.g., with receivers). In the system 580, a source of the equipment 590 can emit energy at a location and a receiver of the equipment 590 can receive energy at a location. The emitted energy can be at least in part along a path of the downgoing energy 597 and the received energy can be at least in part along a path of the upgoing energy 599.

Some examples of techniques that can process seismic data include migration and migration inversion, which may be implemented for purposes such as structural determination and subsequent amplitude analysis. In seismic exploration, signal can be defined as a part of a recorded seismic record (e.g., events) that is decipherable and useful for determining subsurface information (e.g., relevant to the location and production of hydrocarbons, etc.). As an example, a method may include identification of hydrocarbons in a subsurface region as a characterization of the subsurface region where, for example, an extent of the hydrocarbons may be determined via one or more structural features as identified in seismic data (e.g., seismic images, etc.). As an example, a workflow may involve implementing one or more migration and/or migration inversion techniques that may be used to extract subsurface information from seismic reflection data.

FIG. 6 shows an example of a computational framework 600 that can include one or more processors and memory, as well as, for example, one or more interfaces. The blocks of the computational framework 600 may be provided as instructions for implementation by a computing system. The computational framework of FIG. 6 can include one or more features of the OMEGA framework (SLB, Houston, Texas), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 6, the computational framework 600 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 600 can include features for geophysics data processing. The framework 600 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 600 can allow for transforming seismic, electromagnetic, microseismic, and/or vertical seismic profile (VSP) data into actionable information, for example, to perform one or more actions in the field for purposes of resource production, etc. The framework 600 can extend workflows into reservoir characterization and earth modelling. For example, the framework 600 can extend geophysics data processing into reservoir modelling by integrating with the DELFI environment and/or the PETREL framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 600 may provide support for field to final imaging, to prestack seismic interpretation and quantitative interpretation, from exploration to development.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data become available, options exist for tasks to be performed.

As explained, seismic data can provide for model building to facilitate one or more types workflows. Such workflows can include seismic workflows such as seismic inversion workflows where, for example, an initial velocity model can be iteratively refined using seismic data until a match exists between synthetic seismic data generated using the velocity model and actual seismic data as acquired in the field. As to other workflows, these can include reservoir simulation, geomechanical simulation, etc. (see, e.g., the various frameworks of FIG. 1).

A process known as seismic flattening aims to map a seismic volume from its original space in depth (e.g., or two-way traveltime) to a so-called Wheeler domain in geologic time where seismic reflections are horizontally aligned. A Wheeler diagram can be a type of stratigraphic summary chart on which geologic time is plotted as the vertical scale, and distance across the area of interest as the horizontal scale, and on which a variety of stratigraphic information can be collated, for example, to provides an efficient way to interpret a volume of horizons at once. A workflow can include extracting horizontal slices in a flattened space to provide for Wheeler diagram and/or other stratigraphic analyses.

Various slope-based flattening techniques that can locally flatten seismic reflections, however, often fail to flatten the reflections in a global sense and therefore encounter alignment issues for reflections that span across one or more faults. Some techniques can be iterative, which may aim to improve the flattening by using the slopes and correlations of seismic traces. For example, local slopes, estimated for each image sample, can locally follow reflections but may fail to track the reflections over a long distance or correlate the reflections across one or more faults. In such an approach, seismic correlations, computed for randomly and sparsely extracted seismic traces, may help to align the corresponding reflections over a long distance and across faults and provide for computing a relative geologic time (RGT) volume that implicitly includes structure information of a seismic volume. Such an approach may aim to extract an arbitrary number of horizons as isosurfaces of RGT values.

As an example, a seismic interpretation workflow may utilize a so-called flow field technique to track a horizon and relative geological time (RGT) or another time and/or depth. In such an approach, a 3D RGT volume can be generated from two 3D flow fields which follow along inline and crossline directions respectively. A flood fill searching regime can be employed to track RGT traces starting from a seed RGT trace. During this process, a new RGT trace can be obtained by linearly sampling its adjacent seed RGT according to the flow field between the two traces. This technique tends to provide a relatively accurate RGT if accurate flow fields are provided. A so-called loop-tie constraint can also be satisfied if accurate flow fields are provided. Under the loop-tie constraint, the same horizon will be tracked starting from a given seed point located on the horizon. However, in practice the flow field has some amount of error such that error accumulation occurs as a trace becomes farther away from a seed trace. Combined with the fact that for majority of cases a flow field will not completely satisfy loop-tie constraint due to small error, an "X" shape alias (e.g., artefact) can appear on a horizon tracked with a flow field technique using a flood-fill regime. Compared to a region in a tracked 3D RGT that is close to a seed RGT trace, flow fields may be poorly followed in a region farther away from the seed trace. This results in the phenomena that the farther away from the seed trace, an "X" shape alias becomes more prominent.

As explained, a seismic interpretation workflow can be challenging and impact one or more subsequent workflows. Consistent seismic horizon interpretation is fundamental to building geologically valid subsurface structural models, which find various uses (e.g., underground energy extraction, carbon sequestration, etc.). Seismic horizon interpretation workflows tend to be highly manual, which makes a workflow mundane and time-consuming. Various horizon interpretation tools rely heavily on expert knowledge and demand extensive practical experience to properly parameterize them. To address various challenges in seismic data-based workflows, a computational framework can be implemented that provides for semi-automatic multi-horizon interpretation. Such an approach can provide a number of desired seismic horizons interpreted in a single run.

As an example, a framework can be executed for a workflow where input includes multiple seed-points, for a multitude of seismic layers. Such an approach can include utilization of such seed-points simultaneously in an automated or semi-automated manner. As an example, such a framework can allow for input of pre-calculated dip and data quality property volumes. For example, consider property volumes calculated using one or more model-based deterministic techniques and/or one or more machine learning (ML) techniques; noting that a combined or hybrid approach may offer more flexibility and extensibility to handle various types of challenges that may arise in a seismic data-based workflow.

As an example, a framework can provide a progressive path towards a more and more comprehensive and scalable solution as compute power and techniques evolve. As explained, a workflow may operate in a simultaneous manner (e.g., a simultaneous mode) where multiple surfaces (e.g., horizons) are identified simultaneous by propagating from their respective seed-points, which can include, for example, seed-points based on one or more types of data (e.g., log data, etc.). In such an example, surfaces can be generated simultaneously, out from their given seed-points, based on one or more local data quality measurements. As an example, a framework may be configured to propagate surfaces using a ranking technique where, for example, the highest quality seed-points propagate first and fastest to thereby provide geologically consistent guidance to the propagation of the seed-points of more challenging surfaces. Such an approach can be visualized via one or more graphical user interfaces, which may be updated in real-time or near real-time, optionally with graphical controls that can be actuated via one or more human machine interfaces (HMIs). For example, an individual may provide for start, stop, replay, etc., types of commands. Such types of commands may allow an individual to assess quality of one or more surfaces as they are generated for one or more horizons. For example, consider real-time, enablement of an interactive user experience, where the user can perform instant quality-control and/or expert input wherever the user deems that an automated model demands expert steering.

Various seismic data-based workflows can be improved through use of one or more types of automation. For example, automation can make a workflow reproducible and more robust against user bias. As with many human-driven visualization tasks (e.g., radiology, etc.).

As seismic data can be ambiguous, two interpretation experts are not likely to generate the same sub-surface model due to different and unique personal expert insights. As an example, a framework can leverage expert insights and help to make interpretation to be more objective. As an example, a framework may provide for automated interpretation, optionally with opportunities for manual intervention (e.g., manual input that may help guide or steer a machine-based interpretation process).

As an example, a framework may operate without directly tracking surfaces based on waveform shape or polarity. As an example, a framework can provide for tracking surfaces which change polarity, which can ease tracking of features such as unconformities; in contrast to a manual approach where repetitive mouse-clicking is utilized for tracking of unconformities. As an example, a framework can generate surfaces such that an output subsurface model can be water-tight by default, which is not guaranteed by various manual tracking techniques.

As an example, a seismic multi-horizon interpretation (MHI) framework can generate expected results with minimum user interaction, particularly when compared to various manual techniques. Such an approach can help to automate and minimize time demand for complicated horizon interpretation, enabling geoscientists to focus on more valuable and/or complex interpretation tasks. As an example, one or more features of a seismic MHI framework may be integrated into another framework such as, for example, the PETREL framework. As an example, one or more features of a seismic MHI framework may be integrated into one or more drilling operations frameworks, drilling controllers, etc. As an example, a framework may provide for acquiring downhole sensor data and utilizing such data in tracking, which may, for example, provide for more accurate characterization of a subsurface region, which may be, for example, a reservoir or a portion thereof. In directional drilling, a driller (e.g., human and/or machine) may aim to direct a drill bit into a pay zone and maintain the drill bit in the pay zone to thereby increase reservoir contact of a borehole.

As an example, a framework may operate iteratively, for example, in a loop, whereby data acquired downhole during drilling operations may be received and utilized to improve characterization of a subsurface region for purposes of improved directional drilling, which may include, for example, geosteering. As an example, geosteering may involve directional control of a drillstring based at least in part on downhole geological logging data, which may be utilized in combination with multidimensional targets in space (e.g., derived via seismic data, etc.). As an example, geosteering may aim to keep a directional borehole within a pay zone (e.g., for hydrocarbon production, greenhouse gas sequestration, etc.). As an example, geosteering may be employed to help keep a borehole in a particular section of a reservoir, for example, to minimize risk of gas and/or water breakthrough, to maximize economic production from a well (e.g., increased reservoir contact, etc.), etc.

FIG. 7 shows examples of seismic images 710, 720 and 730 of a subsurface geologic region, which are a slice from a 3D cube for an inline value such that the seismic images are given with respect to crossline values and depth values, which may be in terms of TWT (e.g., in ms) or in terms of distance (e.g., in meters). As shown, the seismic image 710 includes seismic data that are color-coded based on amplitude, where amplitude may be considered a seismic attribute. In various portions of the seismic image 710, the seismic signal is confounded by noise such that the signal to noise ratio (SNR) is reduced, which can complicate interpretation. Such a portion may be referred to as chaotic with a low SNR (e.g., less than unity, etc.). For example, rock salt can be present in the lower left half of the seismic image 710, where seismic energy may be less penetrable and hence result in lesser signal. As rock salt is crystalline, it presents challenges in seismic imaging where imaging below rock salt can be difficult. As an example, the subsurface geologic region in FIG. 7 can include sandstone layers where salt was deposited onto (e.g., layered onto) the sandstone layers. In such a sequence, evaporation of water from a salt water body on sandstone can result in salt deposits (e.g., evaporites) on the sandstone. Such salt deposits can form a cap such as a reservoir cap due to the low permeability of salt. For example, salt can form a reservoir cap for formation of a hydrocarbon reservoir with hydrocarbons trapped in porous rock below the reservoir cap.

In FIG. 7, the seismic image 720 includes coded lines (e.g., color, grayscale, etc.) that represent 16 different horizons (e.g., surfaces) that were tracked using a manual interpretation technique. As shown, an arrow identifies a labeled horizon that juts upwardly and downwardly, crossing over various other horizons (see, e.g., inside of ovals), which is contrary to depositional theory. In the seismic image 730, which corresponds to an example of an automated seed-based approach of a computational framework, various horizons are close to various other horizons, which may form a group or groups of relatively close, yet different layers of material. In particular, the seismic image 730 does not exhibit the jutting upwardly and downwardly as exhibited in the seismic image 720 via the arrow and the ovals, which, as mentioned is contrary to depositional theory. In accordance with depositional theory, the interpretation results of the seismic image 730 are vastly superior to those of the seismic image 720.

In FIG. 7, 3D seed points can be selected for a number of horizons (e.g., 16 horizons) where the 3D seed points are on a common trace (e.g., vertical line) such that the 3D seed points are at a common inline position and crossline position where the 3D seed points vary with respect to depth.

As explained, in the seismic image 720, the results are not geologically consistent as crossings exist for some of the horizons, which deviates from a "layer-cake" type of geologic assumption (e.g., per depositional theory). As an example, stratigraphic traps can occur in flat-lying strata, which can fit a layer-cake model. In addition, various great oil fields are found in huge, gently sloping anticlines, where a layer-cake approximation can be acceptable. In various instances, however, in regions of highly complex geologic structure, a layer-cake assumption may be limited. As an example, a method may include partitioning a cube into regions where a layer-cake assumption may be appropriate where, for example, the regions may be spliced together, for example, in a post-tracking process or processes.

A layer-cake assumption can be utilized for a layer-cake model, which may be a velocity model of a subsurface geologic region. In general, a layer-cake model provides a relatively straightforward expression of a sequence of interfaces. A corresponding 1 D synthetic seismogram generated from such a model (e.g., without multiples) may be based on a fixed source wavelet and primary reflections (e.g., a linear time-invariant convolutional model). Such a relationship between a geologic model and a synthetic seismogram can be useful for one or more purposes. Such a relationship may be extended, for example, for a 1D synthetic seismogram with multiples, which may be based on a fixed-source wavelet, primary reflections, and multiple reflections.

As explained, seismic imaging can involve various seismic-wave propagation phenomenon. As explained, pronounced variations in layering may be along a vertical direction such that a 1D representation with respect to depth may be suitable in various instances to capture or explain various seismic-wave propagation phenomena. As explained, a layer-cake, stratified, or layered-earth type of model may be utilized, which may be somewhat akin to an acoustic tube model used in speech processing and to a thin-film model used in optics. As an example, a subsurface region may be represented as a number of layers to form a stratified medium characterized by the interfaces between the layers. In such an example, a vector of discrete amplitudes of signal may represent a digital signal. In seismology, one vector may result if amplitude of signal is measured by a geophone in terms of particle velocity and, for example, another vector may result if amplitude of signal is measured by a hydrophone in terms of pressure. As an example, the inner (or dot) product of such two vectors may provide energy of a signal. As an example, a model may or may not account for dissipation of kinetic energy into heat. If not, then a model may account for all source energy imparted into a region, over time, in terms of resulting elastic wave motion.

As to an example multi-horizon tracking technique, utilization of a layer-cake assumption can provide for simultaneous horizon tracking that enforces geologic constraints in that horizons are distinct and do not cross one another. In such an example, a sequence of horizons can be preserved within a subsurface geologic region.

As an example, a method can include horizon tracking with contextual awareness such that tracking does not violate a geologic constraint (e.g., no layer crossing). In such an example, the method can generate one or more quality metrics, which can include one or more local quality metrics. As an example, uncertainty information (e.g., from an uncertainty cube) may be utilized during tracking to assure that tracking is performed with improved confidence. For example, such an approach can assure that the highest quality horizon is tracked before the lowest quality horizon. For example, horizons may be tracked in an order that depends on quality, which may be quantified using one or more quality metrics. Such an approach can help to assure that geologic constraints are not violated in that a lower quality horizon (e.g., with greater uncertainty, noise, etc.) does not take priority to a higher quality horizon when it comes to enforcement of a crossing constraint. In such an approach, tracking is guided by higher quality (e.g., higher quality signal regions).

As an example, a framework for multi-horizon tracking can include one or more functions for enforcement of one or more geologic constraints, which, as explained, can include one or more anti-crossing constraints such that a horizon does not cross another horizon (e.g., a layer-cake type of assumption).

As an example, as tracking occurs, a new point for a horizon can be generated that is directly or indirectly based on a seed point. In such an example, the new point can be subjected to a geologic constraint assessment to assure that it does not cross another horizon. In the instance that a new point does violate a constraint, the new point can be rejected. Such an approach takes context into account as previous tracked horizons are of lesser uncertainty or, in other words, of greater confidence. Hence, the tracking of multiple horizons can be to at least some extent self-guiding and contextual.

As an example, a multi-horizon tracking framework can implement a method that commences tracking using a seed point, from a list of seed points, that is determined to be associated with a highest confidence horizon. In such a method, the tracking can make successive incremental steps to new points, by distance, from the seed point where each new point can be assessed as to quality (e.g., using one or more quality metrics) and as to lack of violation of one or more geologic constraints.

As to quality, a method can include looking to four neighbors of a point of a horizon where, for example, information in an uncertainty cube may be utilized (e.g., consider signal quality as a quality metric). In such an example, if the four neighbors are of sufficient quality without violation of one or more geologic constraints, they can then be classified as belonging to the horizon.

As explained, from an initial list of 3D seed points, a method can include performing a quality assessment of each of the 3D seed points to determine which corresponding horizon is of the highest quality such that tracking can commence using the 3D seed point of that horizon. As an example, if two or more horizons have substantially the same level of quality, a method may proceed by selecting the shallowest horizon for tracking. In such an example, an assumption may be utilized that a shallower horizon generally has higher confidence (e.g., less uncertainty) than a deeper horizon. In a scenario where two 3D seed points are at the substantially the same depth, then a method may select the 3D seed point with the lowest line number (e.g., lowest inline or crossline number).

As an example, a multi-horizon tracking framework may implement various deterministic rules for selection of a 3D seed point. While various types of deterministic rules are mentioned, one or more additional or alternative deterministic rules may be implemented. For example, consider a scenario where quality of two 3D seed points is substantially the same. In such an example, a framework may assess dip where the 3D seed point with a lower dip is selected for tracking as a lower dip may infer a higher confidence (e.g., lesser uncertainty). As an example, a multi-horizon framework may implement a cascade of rules such that tracking is not logically terminated (e.g., by a lack of an ability to handle a scenario). In such an example, the cascade of rules can be in a tree type of structure with sufficient structure depth and breadth to assure that a high percentage of scenarios (e.g., 99 percent or more) that may be encountered can be readily addressed to help assure automated, non-stop operation. As explained, a rule may be a deterministic rule that is based on some reasonable assumption, which may drive overall quality, ability to track with fewer violations of geologic constraints, etc.

As an example, a multi-horizon tracking framework can generate various metrics that can be output along with horizons (e.g., points associated with corresponding horizons). For example, such a framework can output quality metrics that can be, for example, rendered in 1 D, 2D and/or 3D or, for example, 4D with time as a dimension. As an example, a framework may record operational aspects such that a video or animation can be generated for presentation via a display that allows a user to understand how automated operations were performed. In such an example, a user may intervene, for example, via a graphical user interface. For example, consider a user halting an animation and noting a particular point where an automated decision was made by the framework. In such an example, the user may override the automated decision and have the framework re-run the tracking using a different decision, which may be input by the user (e.g., using a GUI with a menu of selectable options as alternative decisions). In such an approach, a rule may be revised, a new rule added, etc., such that automation can be implemented in a more robust manner with improved results (e.g., output).

As an example, an animation may be generated that can be controlled in time based on one or more metrics. For example, consider running an animation more rapidly based on confidence (e.g., uncertainty). In such an example, the animation may run at higher speed for confident tracking and slow down where confidence decreases. In such an approach, a user may have more time to inspect, intervene, etc., where confidence may be low (e.g., uncertainty high). As an example, a method may provide for generation and rendering of an animation in a real-time manner where animation speed may depend on confidence (e.g., uncertainty) such that an ability to characterize a subsurface region using seismic imaging is improved. For example, a workstation may provide for improved characterization of a subsurface region where a human is in the loop (HITL). In such an approach, the workstation may render graphics to a display at a speed that may be automatically controlled to improve quality, which may be via value-added by the HITL. As an example, such a workstation may provide for adjusting animation rate, for example, as to a lowest speed and a highest speed where, for example, an experienced user may utilize a faster lowest speed than a novice user. As an example, a workstation may control animation speed based on one or more factors. For example, in addition to confidence, complexity of a subsurface region may be taken into account. As another example, animation speed may be controlled for one or more subregions where, for example, a surface may be a surface of a reservoir, a pay zone, etc. In such an example, identified surfaces (e.g., horizons) may provide for improved drilling such as, for example, improved directional drilling.

As an example, directional drilling may include geosteering where, for example, a drillstring may be steered directionally using data from one or more downhole sensors, which may be combined with, compared to, etc., data from seismic imaging. As an example, geosteering may aim to maintain a drillstring within a pay zone that may be defined as a layer between two horizons (e.g., interfaces). In various instances, a distance to an adjacent layer or adjacent layers may be specified, for example, as to reservoir contact, drainage, borehole integrity, etc. In various instances, drilling into an adjacent layer may be detrimental, particularly where such drilling may increase risk of undesirable fluid intrusion, borehole instability, drill bit wear, etc. As an example, output of a framework (e.g., a workstation framework, etc.) may be utilized in real-time or near real-time drilling. For example, consider a framework that may be part of a controller or operatively coupled to a controller for purposes of controlling directional drilling. As explained, a multi-physics approach may be employed where seismic data and other physics-based data are utilized to improve directional drilling. As an example, a controller may be operable at one or more levels of automation. As an example, confidence (e.g., uncertainty) as to a position of a horizon may provide for adjusting a level of automation of a controller. For example, consider utilization of an autodriller that can automatically control field equipment (e.g., one or more of drawworks, mud pumps, top drive, a rotary steerable system (RSS), etc.) to perform directional drilling where a level of automation may be decreased responsive to a change in confidence for a region. In such an example, a decreased level may involve utilization of additional human oversight, some amount or additional amount of manual control, etc. In various instances, an autodriller may aim to drill as rapidly as possible under constraints, which may include quality constrains, etc. For example, consider borehole quality (e.g., borehole integrity, etc.), drill bit quality (e.g., wear, etc.), anti-collision assurance quality, emissions quality, etc.

Figure 8:
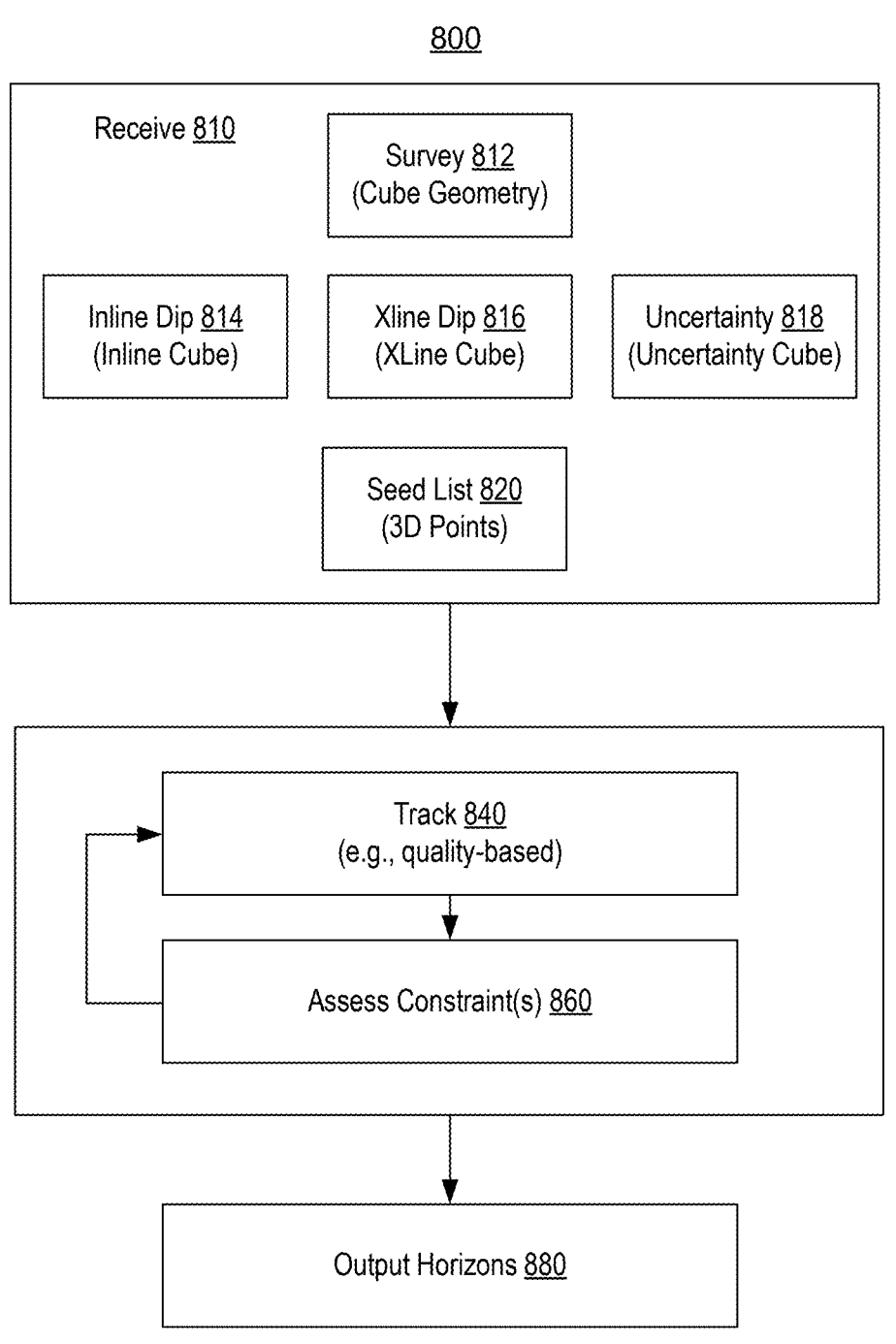
FIG. 8 illustrates an example of a method.

FIG. 8 shows an example of a method 800 that includes a reception block 810 for receiving input, a track block 840 for tracking horizons in a quality-based manner, an assessment block 860 for assessing one or more constraints, and an output block 880 for outputting horizons.

As shown in the example of FIG. 8, the reception block 810 can provide for receipt of survey information 812 (e.g., cube geometry, etc.), inline dip 814 (e.g., an inline dip cube), crossline dip 816 (e.g., a crossline dip cube), uncertainty information 818 (e.g., an uncertainty cube) and a seed list 820 (e.g., of 3D seed points). As explained, tracking can be performed using a seed list where a seed point for a highest confidence horizon is selected to commence tracking that tracks that horizon. Such tracking can continue until one or more criteria are met with respect to switching to a different horizon and a seed point of that different horizon.

As an example, output of the output block 880 may be utilized in one or more workflows. For example, consider a model building workflow that builds a structural model using the horizons. In such an example, the model may be an earth model that is watertight in that the horizons are distinct and continuous. As an example, such a model may be utilized for simulation to generate simulation results, which may include results for fluid flow, geomechanics, synthetic seismograms, inversion, etc.

Figure 9:
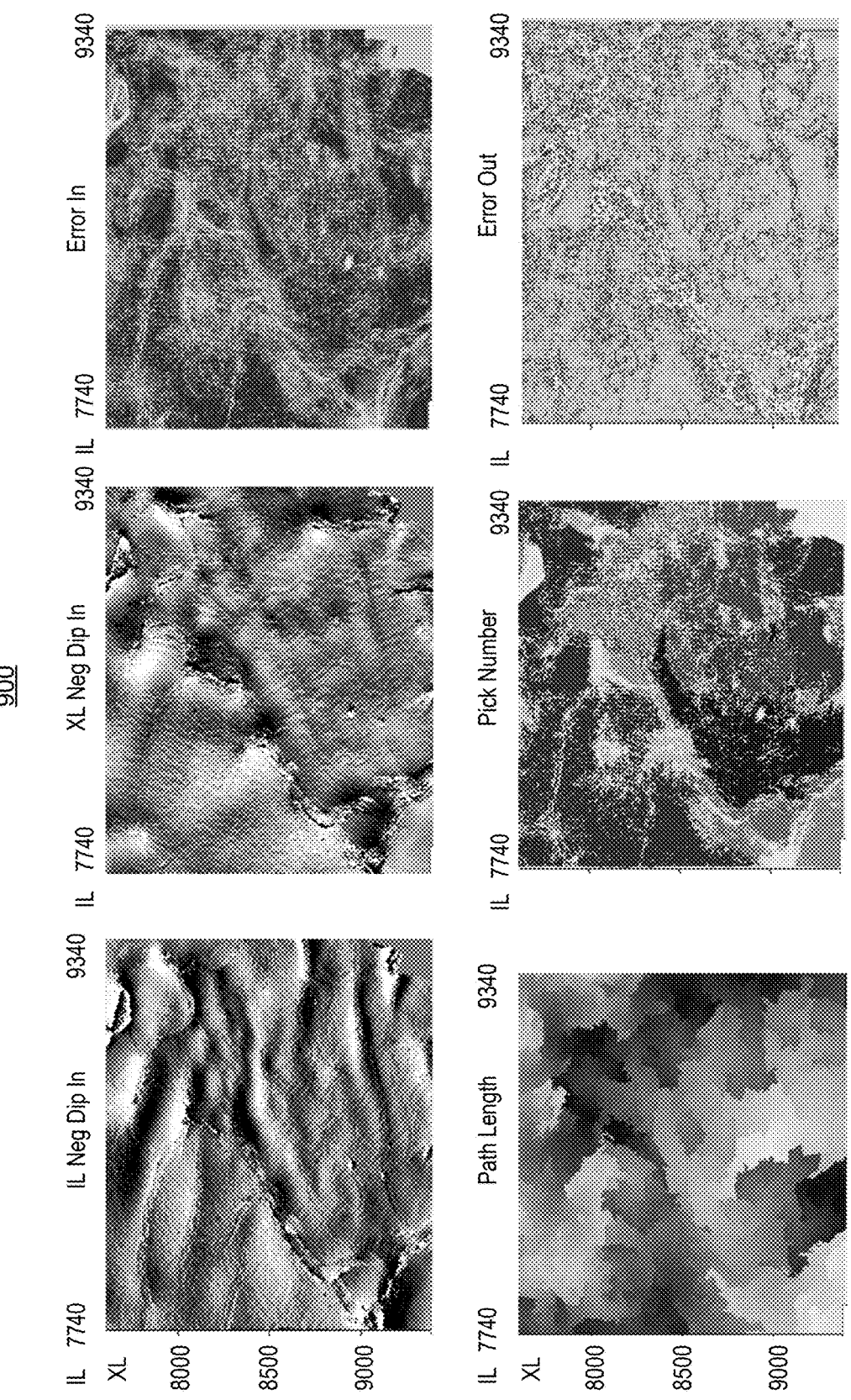
FIG. 9 illustrates examples of seismic images.

FIG. 9 shows example images 900 of a horizon as tracked using a method such as the method 800 of FIG. 8. As explained, a framework may generate one or more metrics during tracking, which may, for example, be rendered spatially with respect to a horizon. As an example, a metric may be a horizon metric that indicates one or more characteristics of a tracked horizon. For example, consider quality metrics that can be rendered as a surface of a tracked horizon that describe quality of the tracked horizon.

In FIG. 9, the images of the top row are shown with respect to inline number (e.g., approximately 7740 to approximately 9340) and crossline number (e.g., approximately 7000 to approximately 10000) and include an image for inline dip and an image for crossline dip, along with an image for uncertainty, which ranges from 0 to 1 (e.g., low uncertainty to high uncertainty). The images for inline dip and crossline dip may be considered dip illumination types of images where dip is illuminated from different perspectives. As an example, the top row images can correspond to inputs to a framework where each image can be from a corresponding cube. The information included in such inputs can provide for automated multi-horizon tracking by a framework.

In FIG. 9, the images of the bottom row are shown with respect to inline number (e.g., approximately 7740 to approximately 9340) and crossline number (e.g., approximately 7000 to approximately 10000) and include an image for path length (e.g., of successive tracked points), an image for pick number (e.g., ranking) and an image for tracking uncertainty, which shows that most of the points tracked are of low uncertainty. In the image for tracking uncertainty, higher values of uncertainty indicate discrepancies between the input dip and the tracked dip. Discrepancies may be due to factors such as, for example, cycle skipping. In the example of FIG. 9, the images of the bottom row are generated using computed values by a multi-horizon tracking method as implemented by a computational framework. Such values (e.g., metrics) can provide for a horizon-by-horizon assessment of output horizons.

As an example, path length (see, e.g., bottom left image) can indicate a path of least resistance from a seed point of a horizon to one or more acceptable or accepted points of the horizon. As an example, a pick number metric can indicate when a surface has been tracked. For example, a blue color may indicate that a surface region highlighted in blue has been tracked earlier than surface regions highlighted in warmer colors (e.g., red, yellow, orange). As explained, a framework can operate in a contextual manner with respect to horizons and quality. As such, an earlier tracked portion of a horizon may indicate that the earlier tracked region is of a higher quality than a later tracked region. For example, the last tracked region may be of lowest quality or highest uncertainty. As mentioned, a framework can generate uncertainty information as to a tracked horizon (see, e.g., the lower right image). For example, consider uncertainty in a per pixel basis of an image. As explained, uncertainty types of metrics (e.g., quality metrics) can be generated such that output horizon quality can be assessed.

Figure 10:
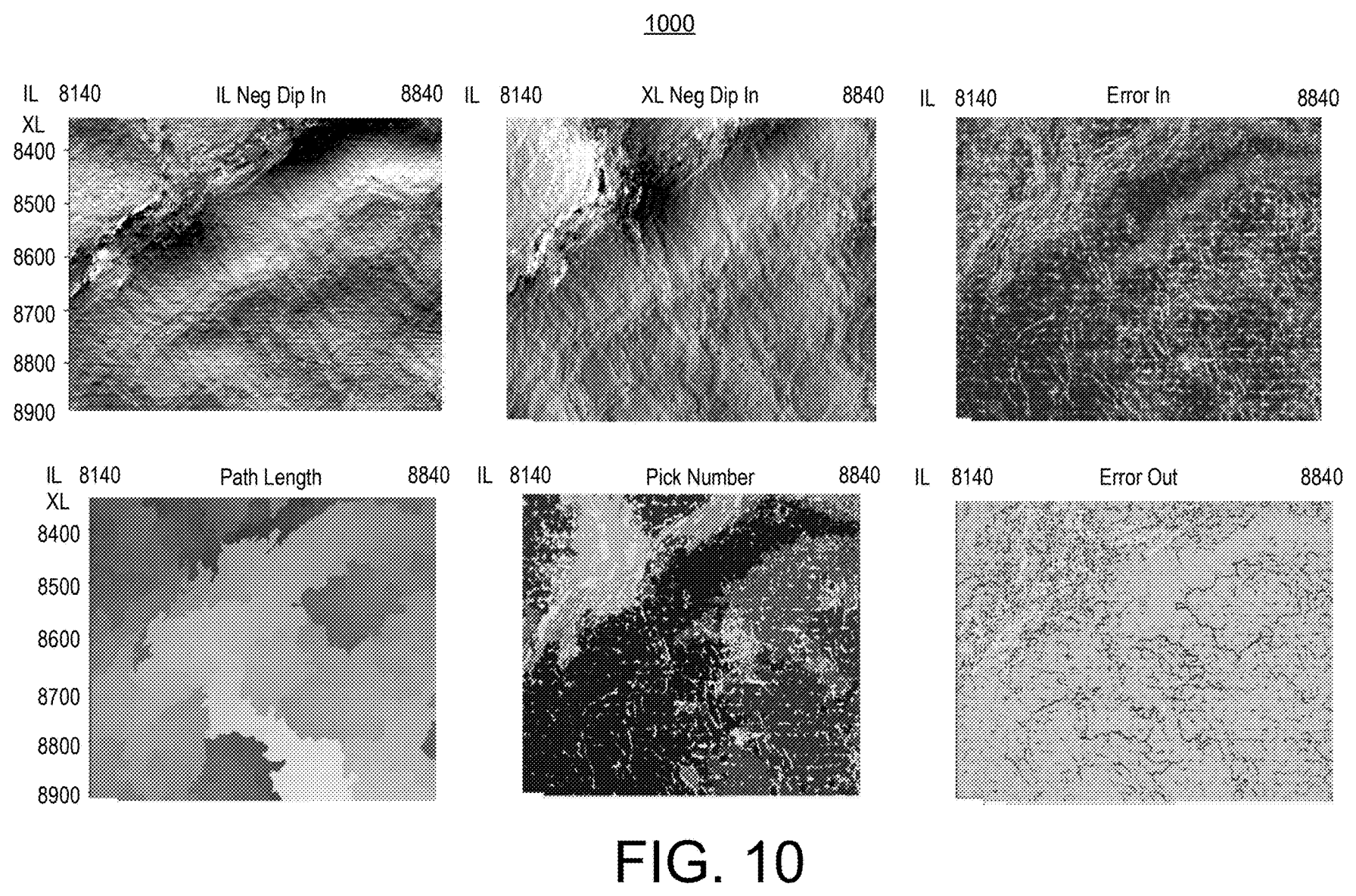

FIG. 10 shows enlarged images 1000 that are enlarged portions of the images 900 of FIG. 9, which may be discerned via the inline number (e.g., approximately 8140 to approximately 8840) and the crossline number (e.g., approximately 8300 to approximately 8900).

Figure 11:
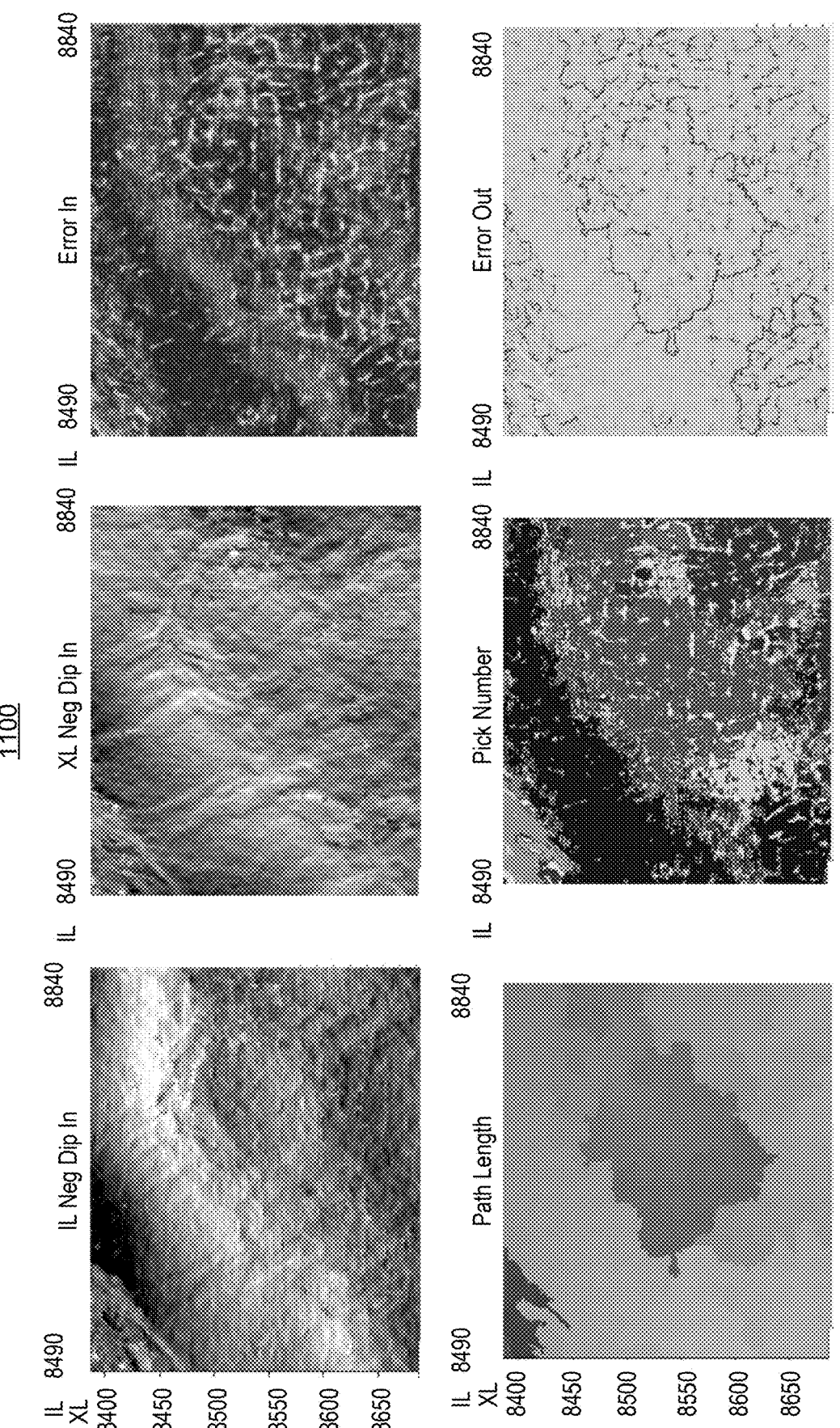
FIG. 11 illustrates examples of seismic images.

FIG. 11 shows enlarged images 1100 that are enlarged portions of the images 1000 of FIG. 10, which may be discerned via the inline number (e.g., approximately 8490 to approximately 8840) and the crossline number (e.g., approximately 8400 to approximately 8700). As an example, a framework may provide for zooming-in and zooming-out as to one or more types of graphics with respect to an image or images (e.g., consider inline and/or crossline zooming, etc.).

As explained, a method can commence with a horizon and track that horizon point-by-point until there is another point on another horizon that has lesser uncertainty (e.g., greater confidence). Such a method can proceed in a serial manner whereby one point is handled at each point in time. As a method progresses for multi-horizon tracking, constraint computations can increase as portions of various horizons are tracked (e.g., filled in) to thereby establish anti-crossing conditions for geologic constraints. As explained, a number of seed point candidates can be quite high, where the seed point candidates (e.g., points), can be sorted.

As an example, a framework may provide for storing ordered seed point candidates using one or more techniques. For example, a framework may utilize a binary tree structure for handling seed point candidates. For example, consider use of a binary search tree (BST), also called an ordered or sorted binary tree, which is a rooted binary tree data structure with the key of each internal node being greater than all the keys in the respective node's left subtree and less than the ones in its right subtree. The time complexity of operations on the binary search tree is directly proportional to the height of the tree.

As an example, a binary tree structure can provide for enhanced interactivity in a semi-automated approach where a user may desire interaction to help guide multi-horizon tracking. For example, a user may insert a point or alter an order of points for purposes of tracking where an ordered list or structure of points is to be updated based on the user interaction. Through use of a binary tree structure, such an update can be performed in a relatively expeditious manner to assure, from the perspective of a user, real-time interactivity. Whereas, for example, if an array was utilized to hold an ordered list, the amount of computation time (or resources) may be substantially increased, which may impact real-time interactivity (e.g., by introducing workflow latency, delay, etc.).

While a binary tree structure is mentioned, one or more other techniques may be implemented that can reduce time or computational demand for maintaining and managing an ordered list.

As explained, a framework can leverage uncertainty for multi-horizon tracking. In such an example, an uncertainty cube may be computed using one or more techniques. For example, uncertainty can pertain to estimated dip. As an example, dip may be computed using a consistent dip technique.

Figure 12:
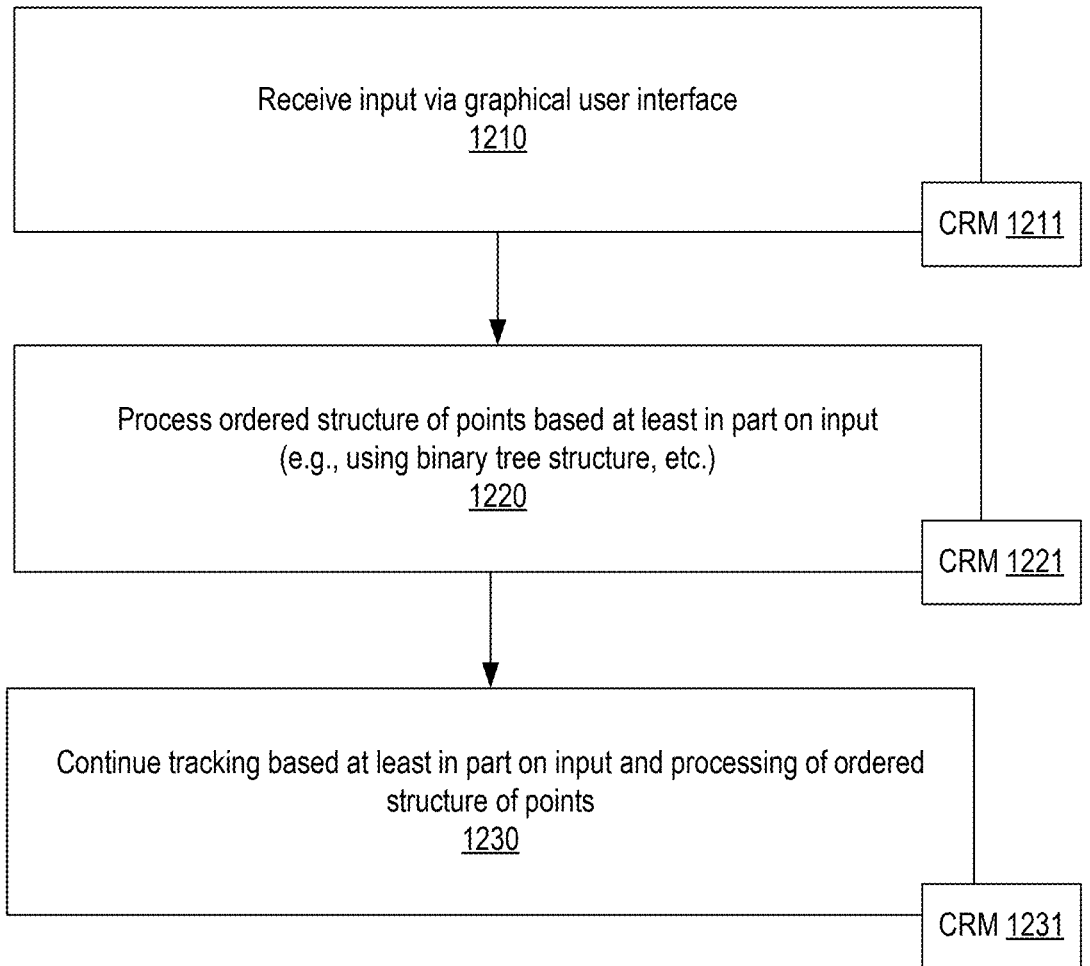
FIG. 12 illustrates an example of a method.

FIG. 12 shows an example of a method 1200 that includes a reception block 1210 for receiving input via a graphical user interface (GUI), a process block 1220 for processing an ordered structure of points based at least in part on the input, and a continuation block 1230 for continuing tracking based at least in part on the input and the processing of the ordered structure of points. As explained, such an approach may utilize a binary tree structure to expedite handling of an ordered structure of points.

As an example, a method may involve using a priority queue that is continuously resorted as new seed points are added, for example, based on the uncertainty of each individual added point. As there may be millions of points in a priority queue, such resorting can be computationally expensive such that implementation of one or more types of mitigating structures (e.g., a binary tree, etc.) can be effective to achieve an interactive response time (e.g., consider real-time interactions that may be renderable to display via a graphical user interface, etc.). As explained, tracking may commence with initial seed points and, as tracking progresses, points may be added to a priority queue, which are then assessed, as appropriate, to reorder the priority queue.

As explained, a framework can implement a seed point-based method for multi-horizon tracking. A portion of example code is presented below pertaining to input for a seed point-based method for multi-horizon tracking.

---

Example code

```
// Input Survey Data Parameters
string survey = "F3";//Name of seismic survey
string dip_il = "100_CD(4,6)_IlNegDip";//Dip
along inline direction (ms/m)
string dip_xl = "100_CD(4,6)_XlNegDip";//Dip
along crossline direction (ms/m)
string err_cube = "100_Variance_Sqrt_Sqrt";//Uncertainty cube
string horizon = "100_MultiHorizon_(04,06)_Constraints";//New
output horizon
// Input Seed Points
PriorityQueue<Point3D> seedList = new PriorityQueue<Point3D> ( );
    seedList.Push(new Point3D (425, 800, 0429.2f, 0));
    seedList.Push(new Point3D (425, 800, 0496.2f, 1));
    seedList.Push(new Point3D (425, 800, 0550.2f, 2));
    seedList.Push(new Point3D (425, 800, 0610.2f, 3));
        * * *
    seedList.Push(new Point3D (425, 800, 1491.2f, 11));
    seedList.Push(new Point3D (425, 800, 1595.2f, 12));
int numHorizons = seedList.Count( );//One seed per horizon
// Commence Tracking
TrackLSF( survey, dip_il, dip_xl, err_cube, horizon,
numHorizons, seedList);
    return;
```

---

As shown in the example code, above, a data quality metric may be utilized by a framework for purposes of multi-horizon tracking. For example, consider use of variance as a data quality metric that provides an indication of uncertainty (e.g., or confidence). In probability theory and statistics, variance is the squared deviation from the mean of a random variable. The variance may also be defined as the square of the standard deviation (e.g., standard deviation is the square root of the variance). Variance is a measure of dispersion, meaning it is a measure of how far a set of numbers is spread out from their average value. Variance may be considered a seismic attribute. For example, consider the PETREL framework, which includes a variance attribute feature that can compute variance values and store them in a data structure such as a three-dimensional array. In the PETREL framework, the variance attribute feature can compute local variance of seismic data through a multi-trace window that may utilize a user-defined size. In such an approach, the local variance may be computed from horizontal sub-slices for each voxel. As an example, a vertical window may be utilized for smoothing the computed variance and observed amplitude normalized. In the PETREL framework, the variance attribute measures the horizontal continuity of the amplitude that is the amplitude difference of the individual traces from their mean value within a gliding common midpoint (CMP) window. While the PETREL framework is mentioned, one or more types of variance or uncertainty attribute cubes may be utilized, which may be computed in one or more manners, for example, consider an uncertainty attribute cube with a value range from 0.0 (no uncertainty) to 1.0 (total uncertainty).

As explained, a framework can generate a ranking of points, which may be referred to as a priority queue. For example, consider the following example statement as to processing of points and a priority queue, along with various data structures (e.g., cache structures).

```
void ProcessAllSeeds (PriorityQueue<Point3D> seedListIn, float errLimit,
float incLimit, float dipLimit, CachedCube, DInCache, CachedCube,
DIpCache,
CachedCube, DXnCache, CachedCube, DXpCache, CachedCube,
ErrCache,
Horizon[ ], horizonArr)
```

As explained, a tree structure may be utilized as a data structure for a priority queue of 3D points. For example, consider the following example statements, which include left tree and right tree structures.

```
class PriorityQueue<T> where T: IComparable
    {
    private T                        root;
    private bool                     rootIsNull;
    private int                      count;
    private PriorityQueue<T>         leftTree;
    private PriorityQueue<T>         rightTree;
    ...}
```

As explained, seed points, which can be organized in one or more data structures, can be processed as part of a multi-horizon tracking method. For example, consider a portion of example code as set forth below.

```
for ( int i = 0 ; i < numSeedsIn ; i++ )
{Point3D seed = seedListIn.GetElement(i); int il =
seed.InlineNo( ); int xl =
seed.XlineNo( ); double twt = seed.TwtPos ( ); // Unit: milli-seconds.
if (IsInsideCube (ErrCache, il, xl, twt))
{seedList.Push(seed);}}
```

As indicated, a method can include getting an element from within a seed point data structure where an element can have an inline number, a crossline number and a two-way travel time in milliseconds or a depth in meters, which provide three-dimensional coordinates for the element, which can be a seed point. As explained, a method can include receiving data as to inline dip, crossline dip and uncertainty where such data can be utilized to assess seed points for purposes of multi-horizon tracking.

As explained, constraints may be utilized to assure that horizons do not cross. For example, consider a portion of example code as presented below.

```
private static
float EnforceGeologicalConstraints (int layerId, int nextIl, int nextXl, float
nextTWT, Horizon[ ] horizonArr, DoubleExtent vExt )
{int numLayers = horizonArr.Length;
if (numLayers >= 2 ) //If more than one layer in model ...
    {float roof = (float) vExt.Begin;
    float floor = (float) vExt.End;
if (layerId == 0) // If is shallowest horizon ...
    {floor = FindHorizonFloor(layerId, nextIl, nextXl, horizonArr, floor);}
else if (layerId == (numLayers − 1)) // If is deepest horizon ...
    {roof = FindHorizonRoof(layerId, nextIl, nextXl, horizonArr, roof);}
else
    {roof = FindHorizonRoof ( layerId, nextIl, nextXl, horizonArr, roof );
    floor = FindHorizonFloor( layerId, nextIl, nextXl, horizonArr, floor);}
    nextTWT = Math.Max(nextTWT, roof );
    nextTWT = Math.Min(nextTWT, floor);}
if ((nextTWT <= (vExt.Begin+2*vExt.Step)) || (nextTWT >= (vExt.End-
2*vExt.Step)))
```

```
{nextTWT = float.NaN;}
return nextTWT;}
```

As shown above, constraints can include a roof constraint and a floor constraint where a horizon is not the shallowest or the deepest horizon, noting that the shallowest horizon can have a floor constraint and that the deepest horizon can have a roof constraint. As explained, as horizons are tracked, they can form a basis for one or more constraints.

As an example, a method can involve tracking that can switch from processing some of the initial seed points and then switch from horizon to horizon using other points, which thereby results in generation of patches (e.g., early, late, etc.) such that a horizon can be made of patches generated at different points in time where, for example, patches for one or more other horizons can be generated in the interim (see, e.g., FIG. 9, FIG. 10 and FIG. 11 as to patches and number). As explained, a seed point may belong to one of various horizons of interest where a method may at various points in time jump from horizon to horizon based on a best possible available seed point quality.

As an example, output of a method may include an array of points, spatially or otherwise labeled with their corresponding horizon. For example, consider output or outputs that includes one or more matrixes of points. As an example, output may include one matrix per horizon where, for example, each value in the matrix corresponds to a depth of a horizon at a spatial location.

FIG. 13 shows an example of a method 1300 that includes a reception block 1310 for receiving seismic data from a three-dimensional seismic survey of a subsurface region that includes multiple horizons; a determination block 1320 for determining an order of a set of points according to data quality metric values of the seismic data, where each point in the set of points is associated with one of the multiple horizons; a tracking block 1330 for tracking the multiple horizons serially, where one or more switching criteria cause the tracking to switch from one of the multiple horizons to another one of the multiple horizons according to the order of the set of points; and an output block 1340 for, based on the tracking, outputting a three-dimensional model of the multiple horizons in the subsurface region.

In the example of FIG. 13, a system 1390 includes one or more information storage devices 1391, one or more computers 1392, one or more networks 1395 and instructions 1396. As to the one or more computers 1392, each computer may include one or more processors (e.g., or processing cores) 1393 and a memory 1394 for storing the instructions 1396, for example, executable by at least one of the one or more processors. As an example, a computer may include one or more network interfaces (e.g., wired or wireless), one or more graphics cards, a display interface (e.g., wired or wireless), etc.

The method 1300 is shown along with various computer-readable media blocks 1311, 1321, 1331 and 1341 (e.g., CRM blocks). Such blocks may be utilized to perform one or more actions of the method 1300. For example, consider the system 1390 of FIG. 13 and the instructions 1396, which may include instructions of one or more of the CRM blocks 1311, 1321, 1331 and 1341.

As an example, a method can include receiving seismic data from a three-dimensional seismic survey of a subsurface region that includes multiple horizons; determining an order of a set of points according to data quality metric values of the seismic data, where each point in the set of points is associated with one of the multiple horizons; tracking the multiple horizons serially, where one or more switching criteria cause the tracking to switch from one of the multiple horizons to another one of the multiple horizons according to the order of the set of points; and, based on the tracking, outputting a three-dimensional model of the multiple horizons in the subsurface region. In such an example, the three-dimensional model may be a watertight model of the multiple horizons in the subsurface region.

As an example, a method can include one or more switching criteria that may include at least one data quality-based switching criterion. As an example, one or more switching criteria may include a layer-cake-based switching criterion. For example, consider a layer-cake-based switching criterion that can prevent one of multiple horizons from crossing another one of the multiple horizons.

As an example, a method can include implementing a layer-cake-based switching criterion responsive to switching from one of multiple horizons to another one of the multiple horizons, where the layer-cake-based switching criterion prevents crossing of the one of the multiple horizons by the other one of the multiple horizons.

As an example, a layer-cake-based switching criterion may include a floor constraint and a roof constraint that constrain each of a number of multiple horizons that are, for example, between a shallowest horizon and a deepest horizon.

As an example, data quality metric values may be or include uncertainty metric values. For example, consider uncertainty metric values that are or include variance values.

As an example, a one-to-one correspondence can exist between each point of a set of points and each of multiple horizons.

As an example, a method can include, responsive to tracking, adding one or more points to a set of points. In such an example, the method may include, responsive to the adding of the one or more points, reordering the set of points. As an example, adding one or more points can be via receiving input via a graphical user interface that specifies at least one point to be added to a set of points.

As an example, a method can include storing a set of points in a tree structure. In such an example, sorting of points may be expedited computationally.

As an example, a method can include tracking where such tracking may generate horizon patches. For example, consider tracking that progresses serially in time where at least one of multiple horizons includes at least a portion of generated horizon patches that may include an early time horizon patch and a later time horizon patch, where, for example, the early time horizon patch has lesser uncertainty than the later time horizon patch. In such an example, horizon patches may be ranked with respect to uncertainty. As an example, a method may include ranking horizon patches and, for example, rendering one or more of the horizon patches to a graphical user interface on a display where, for example, interpreting, quality controlling, etc., may be performed, which may aim to improve certainty as to a horizon patch or horizon patches. In such an example, horizon patches with greater uncertainty may be rendered first as one or more interactions via a GUI may aim to reduce uncertainty thereof. Or, for example, horizon patches with lesser uncertainty may be rendered first to provide an assessment of horizons or portions thereof with the greatest certainty (e.g., least uncertainty). In such an approach, a user may readily comprehend a level of certainty that may be achievable for a project (e.g., acquired seismic data).

As an example, a method can include generating one or more metrics based on tracking. In such an example, the method can include rendering a graphical representation of at least a portion of a three-dimensional model in combination with at least one of the one or more metrics.

As an example, a system can include a processor; a memory accessible by the processor; processor-executable instructions stored in the memory and executable to instruct the system to: receive seismic data from a three-dimensional seismic survey of a subsurface region that includes multiple horizons; determine an order of a set of points according to data quality metric values of the seismic data, where each point in the set of points is associated with one of the multiple horizons; perform tracking of the multiple horizons serially, where one or more switching criteria cause the tracking to switch from one of the multiple horizons to another one of the multiple horizons according to the order of the set of points; and, based on the tracking, output a three-dimensional model of the multiple horizons in the subsurface region.

As an example, one or more non-transitory computer-readable storage media can include computer-executable instructions executable to instruct a computing system to: receive seismic data from a three-dimensional seismic survey of a subsurface region that includes multiple horizons; determine an order of a set of points according to data quality metric values of the seismic data, where each point in the set of points is associated with one of the multiple horizons; perform tracking of the multiple horizons serially, where one or more switching criteria cause the tracking to switch from one of the multiple horizons to another one of the multiple horizons according to the order of the set of points; and, based on the tracking, output a three-dimensional model of the multiple horizons in the subsurface region.

As an example, a computer program product can include instructions to instruct a computing system to perform one or more methods as described herein.

As an example, a system may include instructions, which may be provided to analyze data, control a process, perform a task, perform a workstep, perform a workflow, etc.

FIG. 14 shows components of an example of a computing system 1400 and an example of a networked system 1410 and a network 1420. The system 1400 includes one or more processors 1402, memory and/or storage components 1404, one or more input and/or output devices 1406 and a bus 1408. In an example embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1410, which includes a network 1420. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s)

1422-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
  receiving seismic data from a three-dimensional seismic survey of a subsurface region that includes multiple horizons;
  determining an order of a set of points according to data quality metric values of the seismic data, wherein each point in the set of points is associated with one of the multiple horizons, and wherein the data quality metric values comprise uncertainty metric values;
  tracking the multiple horizons serially, wherein one or more switching criteria cause the tracking to switch from one of the multiple horizons to another one of the multiple horizons according to the order of the set of points; and
  based on the tracking, outputting a three-dimensional model of the multiple horizons in the subsurface region.

2. The method of claim 1, wherein the three-dimensional model comprises a watertight model of the multiple horizons in the subsurface region.

3. The method of claim 1, wherein the one or more switching criteria comprise a data quality-based switching criterion.

4. The method of claim 1, wherein the one or more switching criteria comprise a layer-cake-based switching criterion.

5. The method of claim 4, wherein the layer-cake-based switching criterion prevents one of the multiple horizons from crossing another one of the multiple horizons.

6. The method of claim 4, comprising implementing the layer-cake-based switching criterion responsive to switching from the one of the multiple horizons to the other one of the multiple horizons, wherein the layer-cake-based switching criterion prevents crossing of the one of the multiple horizons by the other one of the multiple horizons.

7. The method of claim 4, wherein the layer-cake-based switching criterion comprises a floor constraint and a roof constraint that constrain each of a number of the multiple horizons that are between a shallowest horizon and a deepest horizon.

8. The method of claim 1, wherein the uncertainty metric values comprise variance values.

9. The method of claim 1, wherein a one-to-one correspondence exists between each point of the set of points and each of the multiple horizons.

10. The method of claim 1, comprising, responsive to the tracking, adding one or more points to the set of points.

11. The method of claim 10, comprising, responsive to the adding of the one or more points, reordering the set of points.

12. The method of claim 10, wherein the adding comprises receiving input via a graphical user interface that specifies a point to be added to the set of points.

13. The method of claim 1, comprising storing the set of points in a tree structure.

14. The method of claim 1, wherein the tracking generates horizon patches.

15. The method of claim 14, wherein the tracking progresses serially in time and wherein at least one of the multiple horizons comprises at least a portion of the horizon patches that comprise an early time horizon patch and a later time horizon patch, wherein the early time horizon patch has lesser uncertainty than the later time horizon patch.

16. The method of claim 1, comprising generating one or more metrics based on the tracking.

17. The method of claim 16, comprising rendering a graphical representation of at least a portion of the three-dimensional model in combination with at least one of the one or more metrics.

* * * * *